US011811771B2

(12) United States Patent
Butcher et al.

(10) Patent No.: US 11,811,771 B2
(45) Date of Patent: Nov. 7, 2023

(54) NGAC GRAPH EVALUATIONS

(71) Applicant: Tetrate.io, San Francisco, CA (US)

(72) Inventors: Zachary Daniel Butcher, San Francisco, CA (US); Ignacio Barrera Caparros, Barcelona (ES); Joshua Douglas Roberts, Ashburn, VA (US)

(73) Assignee: TETRATE.IO, San Francisco, CA (US)

( * ) Notice: Subject to any disclaimer, the term of this patent is extended or adjusted under 35 U.S.C. 154(b) by 126 days.

(21) Appl. No.: 16/953,014

(22) Filed: Nov. 19, 2020

(65) Prior Publication Data

US 2022/0159003 A1  May 19, 2022

(51) Int. Cl.
*H04L 29/06* (2006.01)
*H04L 9/40* (2022.01)

(52) U.S. Cl.
CPC .................. *H04L 63/101* (2013.01)

(58) Field of Classification Search
CPC ................................................. H04L 63/101
See application file for complete search history.

(56) References Cited

U.S. PATENT DOCUMENTS

| | | | | |
|---|---|---|---|---|
| 8,042,150 B2* | 10/2011 | Haswarey | ............. | G06F 21/604 726/1 |
| 8,381,306 B2* | 2/2013 | McPherson | ......... | G06F 21/6218 726/28 |
| 8,458,337 B2* | 6/2013 | Corley | .................. | H04L 63/102 709/227 |
| 8,875,230 B1* | 10/2014 | Weiner | .................... | H04L 63/10 726/1 |
| 10,127,393 B2* | 11/2018 | Ferraiolo | .............. | G06F 16/284 |
| 2009/0117390 A1* | 5/2009 | Stamm | ...................... | B22F 7/04 428/447 |
| 2009/0260056 A1* | 10/2009 | Garg | ..................... | G06F 21/629 726/1 |

(Continued)

OTHER PUBLICATIONS

Peter Mell et al. (hereinafter Mell): "Restricing Insider Access Through Efficient Implementation of Mutli-Policy Access Control Systems.", Oct. 28, 2016, pp. 13-21. (Year: 2016).*

(Continued)

*Primary Examiner* — Yonas A Bayou
(74) *Attorney, Agent, or Firm* — FIG. 1 Patents

(57) ABSTRACT

In implementations of NGAC graph evaluations, a computing device implements a next generation access control (NGAC) graph that includes user elements representing users, object elements representing resources, and multiple policy classes. Policy binding nodes can be modeled as user attributes in the NGAC graph for each of the multiple policy classes, and each policy binding node is assigned to a corresponding one of the multiple policy classes. A user element is assigned as a member of a policy binding node, and the policy binding node delineates at least one policy permission on an object element and grants the policy permission on the object element to the user element. The computing device implements a policy decision module to evaluate the NGAC graph with a graph evaluation procedure to determine graph analysis information relative to at least one of the user element, the granted policy permission, or the object element.

21 Claims, 12 Drawing Sheets

(56) References Cited

U.S. PATENT DOCUMENTS

| | | | |
|---|---|---|---|
| 2011/0313782 A1* | 12/2011 | DeMeyer | G16H 10/20 705/2 |
| 2012/0159566 A1* | 6/2012 | Hrastnik | G06F 21/6218 726/21 |
| 2013/0227638 A1* | 8/2013 | Giambiagi | G06F 21/00 726/1 |
| 2017/0024572 A1* | 1/2017 | Ferraiolo | G06F 16/176 |
| 2022/0156393 A1* | 5/2022 | Butcher | G06F 9/5011 |
| 2022/0159003 A1* | 5/2022 | Butcher | H04L 63/101 |

OTHER PUBLICATIONS

ANSI. American national standard for information technology—next generation access control—generic operations and data structures (NGAC-GOADS), 2016. (Year: 2016).*

* cited by examiner

NGAC GRAPH EVALUATIONS

BACKGROUND

Generally, access control in the context of information security can be modeled and implemented to regulate access requests to view and/or edit resources, such as electronic documents and other information that is stored and accessible in a computing environment. Notably, the goal of an access control policy is to prevent unauthorized and/or unintended access on the resources, and enforcement of designated permissions that may be granted to various users and/or client applications that seek to access and perform operations on a set of resources. Conventional and widely used access control models include the Attribute-Based Access Control (ABAC) model and the Role-Based Access Control (RBAC) model.

Generally, the ABAC model is used to develop access control policies, expressing a complex Boolean rule set used to evaluate many different attributes. Although ABAC is generally regarded as complicated to understand and difficult to use for authoring an access control policy that operates as intended, it is flexible and can be used to model many different types of access control policies for information security based on attribute types assigned to the various users and/or client applications that may request access to a resource. The RBAC model, on the other hand, is generally regarded as easy to understand and usable to author access control policies that perform information security access control correctly. RBAC-based systems designate user roles, such as in the context of a doctor, a bank teller, a computer, a client application, etc., to make access control decisions. However, with RBAC, it can be difficult to identify and manage every user role possibility, leading to an exponential expansion or explosion of the roles being modeled. Further, these ABAC and RBAC access control models do not encode the type of user and entity access information that would otherwise provide insight as to why a user has or was allowed access to an object or other entity based on policy permissions.

A developing access control model is Next Generation Access Control (NGAC), which is generally defined as an attribute-based access control model. The NGAC specification was developed by the National Institute of Standards and Technology (NIST), and is an American National Standard for Information Technology (ANSI) Insights standard, also referred to as the INCITS NGAC Specification. The NGAC model is an architecture designed to be separable from any particular policy or type of policy, and can provide access control for simple systems, as well as highly-distributed computing environments. A policy author can use NGAC to directly model users, objects, and their relations in an NGAC graph, and apply access control decisions by traversing the graph. Although NGAC has the flexibility of ABAC to develop many different types of access control policies for information security, the NGAC specification has design limitations and is left open for changing technologies. Notably, the NGAC specification generally describes what constitutes a valid implementation, but does not provide significant guidance or implementation details.

SUMMARY

This Summary introduces features and concepts of NGAC graph evaluations, which is further described below in the Detailed Description and shown in the Figures. This Summary should not be considered to describe essential features of the claimed subject matter, nor used to determine or limit the scope of the claimed subject matter.

Aspects of NGAC graph evaluations are described. In implementations, a computing device can generate a next generation access control (NGAC) graph having multiple policy classes configured as enforceable access criteria by which users are allowed or denied access to resources. The NGAC graph has a bifurcated structure with a user section that includes the users modeled as user elements and an object section that includes the resources modeled as object elements. Policy binding nodes can be modeled as user attributes in the user section of the NGAC graph, where the policy binding nodes are modeled for each of the multiple policy classes and each of the policy binding nodes are assigned to a corresponding one of the multiple policy classes. A user element can be assigned as a member of a policy binding node, where the user element is contained by the corresponding policy class, and the policy binding node delineates a policy permission on an object element and grants the policy permission on the object element to the user element. In implementations, the NGAC graph is a directed acyclic graph (DAG) structure generated and stored as a bi-directional graph structure facilitating evaluations of the NGAC graph with graph evaluation procedures.

The graph evaluation procedures can be implemented to determine the graph analysis information from the NGAC graph, such as to compute an access control decision given a user element, a policy permission, and an object element to determine whether or not the user element is granted access to the object element based on the policy permission. A graph evaluation procedure includes to generate a user list given a user element and a granted policy permission to identify a set of the object elements that the user element can access based on the granted policy permission. The graph evaluation procedures also include to generate an object list given an object element and the granted policy permission to identify a set of the user elements that can access the object element based on the granted policy permission and/or to generate a permissions test given the user element and the object element to identify a set of granted policy permissions that the user element is assigned on the object element. A graph evaluation procedure includes to perform an explain given an object element and a user element to determine a singular traversal path through the NGAC graph between the user element and the object element. A graph evaluation procedure includes to perform a precheck-audit given an object element and a user element to determine an effect of an off-line policy permission before the off-line policy permission is granted. The graph evaluation procedures also include to perform an audit-explain given a previous state snapshot of the NGAC graph and a logical timestamp to determine why an access by the user element was allowed or not allowed on the object element based on a granted policy permission.

In other aspects of NGAC graph evaluations, a computing device can execute an instantiation of a next generation access control (NGAC) graph that includes user elements representing users, object elements representing resources, and multiple policy classes modeled with a composable policy class structure that is repeatable to instantiate each of the multiple policy classes in the NGAC graph. The composable policy class structure includes a policy class as enforceable access criteria by which the user elements are allowed or denied access to the object elements that represent the resources. The composable policy class structure also includes an exclusion default object node of the policy class, an exclusion default user node of the policy class, and an association that indicates the object elements contained as members of the exclusion default object node grant all policy permissions of the policy class to the user elements that are contained as members of the exclusion default user node. The policy permissions granted by the object elements allow the user elements to perform operations on contents of the object elements that represent the resources.

The NGAC graph is modeled with policy binding nodes as user attributes in the graph, with the policy binding nodes modeled for each of the multiple policy classes and each of the policy binding nodes assigned to a corresponding one of the multiple policy classes. Each of the policy binding nodes can delineate at least one policy permission on an object element for the user elements that are assigned as members of one or more of the policy binding nodes. The computing device can receive a request to evaluate the NGAC graph with a graph evaluation procedure to determine graph analysis information relative to at least one of the user elements, the object elements, or granted policy permissions of the multiple policy classes. The computing device can then return, in response to the request, the determined graph analysis information that is determined utilizing one or more of the graph evaluation procedures, as detailed above, to compute an access control decision, generate a user list, generate an object list, generate a permissions test, perform an explain, perform a precheck-audit, and/or perform an audit-explain.

In other aspects of NGAC graph evaluations, a computing device is implemented for graph-based access control in a digital medium environment, and the computing device includes a memory to maintain a next generation access control (NGAC) graph that includes user elements representing users, object elements representing resources, and multiple policy classes modeled with a composable policy class structure that is repeatable to instantiate each of the multiple policy classes in the NGAC graph. The computing device implements a graph module that is designed to model policy binding nodes as user attributes in the NGAC graph, the policy binding nodes modeled for each of the multiple policy classes and each of the policy binding nodes being assigned to a corresponding one of the multiple policy classes. The policy binding nodes can delineate at least one policy permission on an object element, and a user element assigned as a member of one of the policy binding nodes is contained by the corresponding policy class and the binding node grants the policy permission on the object element to the user element. The computing device also implements a policy decision module that is designed to evaluate the NGAC graph with a graph evaluation procedure to determine graph analysis information relative to at least one of the user element, the granted policy permission, or the object element. In implementations, the NGAC graph is a directed acyclic graph (DAG) structure generated and stored in the memory of the computing device as a bi-directional graph structure facilitating one or more of the graph evaluation procedures to determine the graph analysis information. The graph evaluation procedures, as detailed above, include to compute an access control decision, generate a user list, generate an object list, generate a permissions test, perform an explain, perform a precheck-audit, and/or perform an audit-explain.

BRIEF DESCRIPTION OF THE DRAWINGS

Implementations of NGAC graph evaluations are described with reference to the following Figures. The same numbers may be used throughout to reference similar features and components that are shown in the Figures.

DETAILED DESCRIPTION

Figure 1:
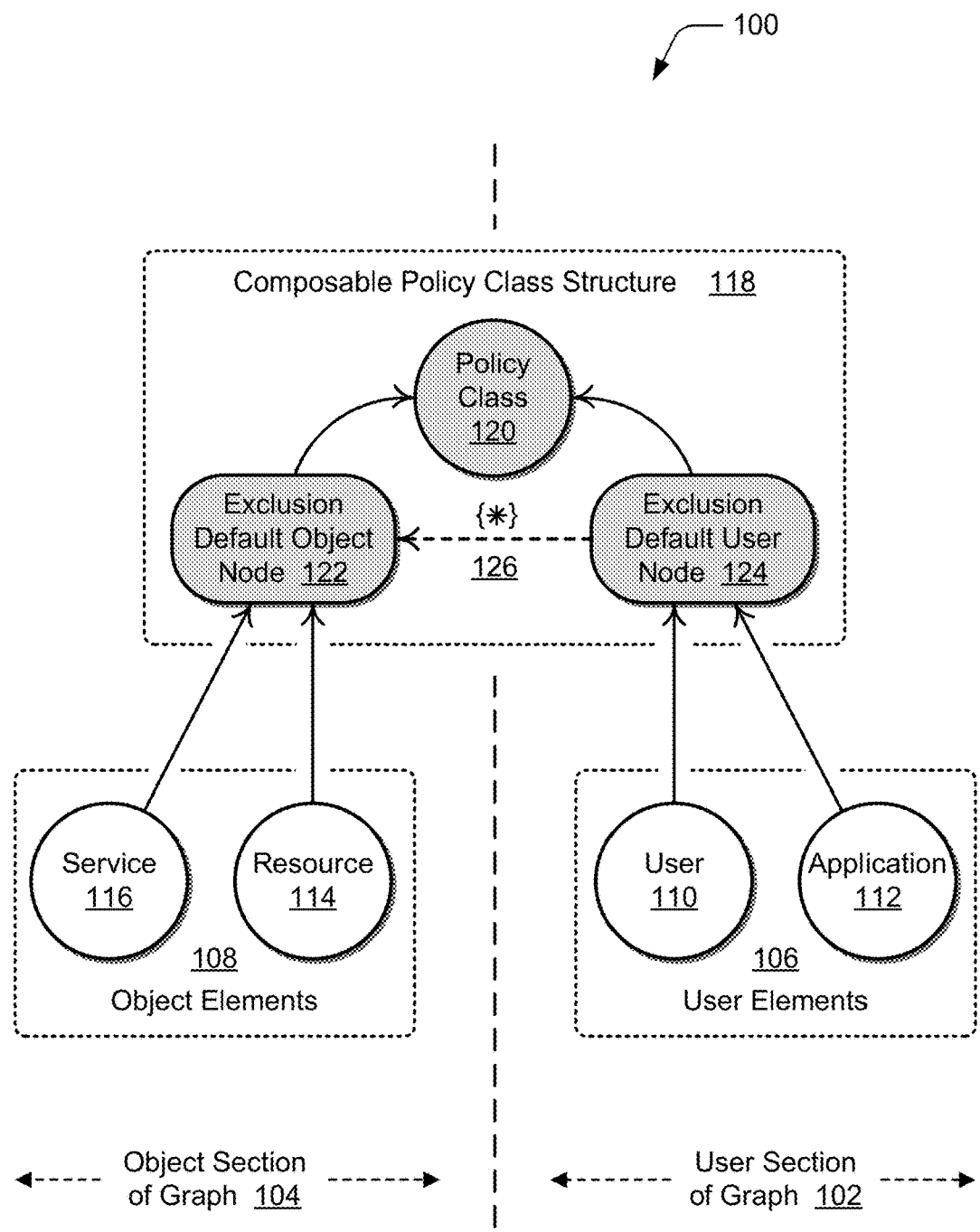
FIG. 1 illustrates an example of a next generation access control (NGAC) graph that includes features of the graph implemented with a composable policy class structure for NGAC graph evaluations.

Implementations of NGAC graph evaluations are described, and generally in the context of information security and access control policies, provide graph evaluation procedures that can be initiated to determine graph analysis information relative to a user element, a policy permission, and/or an object element based on a singular traversal path through the NGAC graph between the user element and the object element via a policy binding. Given the novel configuration of the NGAC graph as described herein, aspects and features of NGAC graph evaluations can be implemented. The various assignments and associations of the user elements and the object elements in the multiple policy configuration of the NGAC graph can be read semantically, directly from the graph to facilitate formulating and ascertaining the NGAC graph evaluations.

In practice, a policy author can independently determine which policy class, or combination of the policies, allowed a user to access a resource or service in the NGAC graph, and which policy class, if any, was supposed to allow the user to access the resource or the service in the graph. Central to the aspects and features of NGAC graph evaluations is the novel structure and data organization in the NGAC graph, which allows determining the graph analysis information, is efficient to evaluate during a runtime instantiation of the NGAC graph, the evaluations are performant and can be performed on-line, and enables the NGAC graph evaluation procedures.

Notably, the NGAC graph can be evaluated using the graph evaluation procedures to determine the graph analysis information from the graph, such as to compute an access control decision given a user element, a policy permission, and an object element to determine whether or not the user element is granted access to the object element based on the policy permission. A graph evaluation procedure includes to generate a user list given a user element and a granted policy permission to identify a set of the object elements that the user element can access based on the granted policy permission. The graph evaluation procedures also include to generate an object list given an object element and the granted policy permission to identify a set of the user elements that can access the object element based on the granted policy permission and/or to generate a permissions test given the user element and the object element to identify a set of granted policy permissions that the user element is assigned on the object element. A graph evaluation procedure includes to perform an explain given an object element and a user element to determine a singular traversal path through the NGAC graph between the user element and the object element. A graph evaluation procedure also includes to perform a precheck-audit given an object element and a user element to determine an effect of an off-line policy permission before the off-line policy permission is granted. The graph evaluation procedures also include to perform an audit-explain given a previous state snapshot of the NGAC graph and a logical timestamp to determine why an access by the user element was allowed or not allowed on the object element based on a granted policy permission.

As further described herein, an NGAC graph can be modeled using a composable policy class structure that is repeatable to instantiate multiple policy classes in the graph. The composable policy class structure is also usable to introduce a new policy class into the NGAC graph without affecting or breaking other policy classes that have already been modeled in the graph. Notably, the NGAC specification does not specify or detail any such graph configuration to implement or model NGAC. The overall NGAC graph configuration, along with the composable policy class structure that is repeatable to model access control policies as described herein, also provides for reusing current NGAC graph nodes that already exist in the graph when adding a new policy class to the graph. The ability to reuse current NGAC graph nodes when modeling multiple policy classes can prevent or reduce the problems of exponential node expansion that is inherent with other types of access control systems, leading to improved computational speed when computing an access control decision using the NGAC graph, and reduced memory storage space needed to save an overall instantiation of the graph.

In NGAC convention, an NGAC graph is generally modeled to include different types of nodes, such as user elements and object elements, as well as user attributes, object attributes, and policy classes. The user attributes serve to distinguish between distinct classes of the users in the graph, and similarly, the object attributes serve to distinguish between different types of the objects in the graph. An NGAC graph also includes associations that allocate policy permissions from the object elements to the user elements. However, the NGAC specification does not provide implementation details describing how to model multiple policy classes in an NGAC graph, or what may be considered best practices. Notably, the NGAC specification is open-ended, allowing for flexibility and technology changes that may necessitate adaptation.

While features and concepts of NGAC graph evaluations can be implemented in any number of different devices, systems, networks, environments, and/or configurations, implementations of NGAC graph evaluations are described in the context of the following example devices, systems, environments, and methods.

FIG. 1 illustrates an example of a next generation access control (NGAC) graph 100 that includes features of the graph implemented with a composable policy class structure for NGAC graph evaluations, as described herein. The NGAC graph 100 can be generated having a bifurcated structure with a user section 102 of the graph, and an object section 104 of the graph. The respective sections of the NGAC graph 100 may also be referred to as the user side and the object side of the graph, and each section or side of the graph includes independent, but related entities referred to generally as the users and the objects. The NGAC graph 100 can include any number and different types of users that are modeled as user elements 106 in the user section 102 of the graph, and can include any number and different types of resources that are modeled as object elements 108 in the object section 104 of the graph.

The user elements 106 represent any type of user entity, such as a user 110 or an application 112, that can request access to the resources based on access criteria and permissions established by multiple policy classes, which are also modeled in the NGAC graph 100. In this example, the user 110 may be modeled as one or many users, such as a group or team of users. Similarly, the application 112 may be modeled as one or many instantiations of an application, or as separate modules or functions of the application. The object elements 108 also represent any type of resource entity, such as a resource 114 or a service 116, that is accessible by a user having allowable access permissions, or is protected from user access by a user that does not have allowable access permissions. In this example, the resource 114 and/or the service 116 may also be modeled as one or multiple instances of the respective resource or service.

In NGAC convention, the NGAC graph 100 is generally modeled to include different types of nodes, such as the user elements 106 and the object elements 108, as well as user attributes, object attributes, and policy classes. The user attributes serve to distinguish between distinct classes of the users in the graph, and similarly, the object attributes serve to distinguish between different types of the objects in the graph. In implementations, the NGAC graph 100 can be generated with multiple policy classes as enforceable access criteria by which the users are allowed or denied access to the resources.

In aspects of the described NGAC graph evaluations, the NGAC graph 100 includes a composable policy class structure 118, which is repeatable to instantiate multiple policy classes of the NGAC graph 100. For example, the policy class 120, and subsequent policy classes, can be configured in the NGAC graph 100 utilizing the composable policy class structure 118 in a repeatable manner. The composable policy class structure 118 provides a safe way to introduce a new policy class into the NGAC graph 100 without affecting or breaking another policy class that has already been modeled in the graph. Additional examples of NGAC graphs having multiple policy classes are further shown and described with reference to FIGS. 2-6. Notably, the composable policy class structure 118 is repeatable effective to coordinate multiple policy classes, including different types of policy classes, in the NGAC graph 100. The composable policy class structure 118 is repeatable, from which the multiple policy classes can be instantiated in an NGAC graph.

The composable policy class structure 118 includes the policy class 120, which provides an enforceable access criteria by which the users are allowed or denied access to the object elements (e.g., the resources and services). Generally, a policy class defines the entity relationships, access rights, and operations of an access control policy. The NGAC graph 100 can be modeled or implemented with multiple, different types of policy classes, which can include a location policy class, a role-based access control (RBAC) policy class, a time policy class, and/or any other type of policy class utilized in the context of an access control policy.

The composable policy class structure 118 includes an exclusion default object node 122 of the policy class 120 instantiated in the object section 104 of the NGAC graph. Similarly, the composable policy class structure 118 includes an exclusion default user node 124 of the policy class 120 instantiated in the user section 102 of the NGAC graph. The exclusion default object node 122 is an example of an object attribute in the NGAC graph 100, and the exclusion default user node 124 is an example of a user attribute in the NGAC graph. The exclusion default object node 122 and the exclusion default user node 124 are each assigned as members of the policy class 120, in the respective object section 104 and the user section 102 of the graph. This effectively models the policy class 120 as an exemption in the NGAC graph 100. In NGAC convention, a node designation is referred to as an assignment, and the assignments are used to indicate relationships between the user elements 106 and user attributes, between the object elements 108 and object attributes, as well as the relationships between the user attributes and the policy classes, and the object attributes and the policy classes.

In implementations, one or more of the user elements 106 that represent the various users (e.g., user 110 and application 112) in the user section 102 of the NGAC graph 100 can each be contained as a member of the policy class 120 via the exclusion default user node 124 of the policy class. Similarly, one or more of the object elements 108 that represent the various resources (e.g., resource 114 and service 116) in the object section 104 of the NGAC graph 100 can each be contained as a member of the policy class 120 via the exclusion default object node 122 of the policy class. In implementations, a user element in the NGAC graph 100 can be designated, related, or contained as a member of a policy class, such as via an exclusion default user node and/or via a policy binding. Alternatively stated, the policy class contains the user element. Similarly, an object element in the NGAC graph 100 can be designated, related, or contained as a member of a policy class, such as via an exclusion default object node and/or via a policy binding. Notably, if an object element 108 that is not contained by the policy class 120 in some way on the object side (e.g., in the object section 104 of the graph), then the policies of the policy class 120 do not apply to the object element, regardless of whether the user element on the user side (e.g., in the user section 102 of the graph) is contained as a member of the policy class.

The composable policy class structure 118 also includes an association 126 that indicates the object elements 108 contained as members of the exclusion default object node 122 grant all of the policy permissions to the user elements 106 that are contained as members of the exclusion default user node 124. Generally, the association 126 is a directed graph edge that represents and defines the authorization of access rights between policy elements, such as for operations to read, write, create, and/or delete policy elements and relations. In this example, the policy permissions indicated by the association 126 allow the user elements 106 to perform operations on contents of the object elements 108 that represent the various resources, such as the resource 114 and the service 116.

Figure 2:
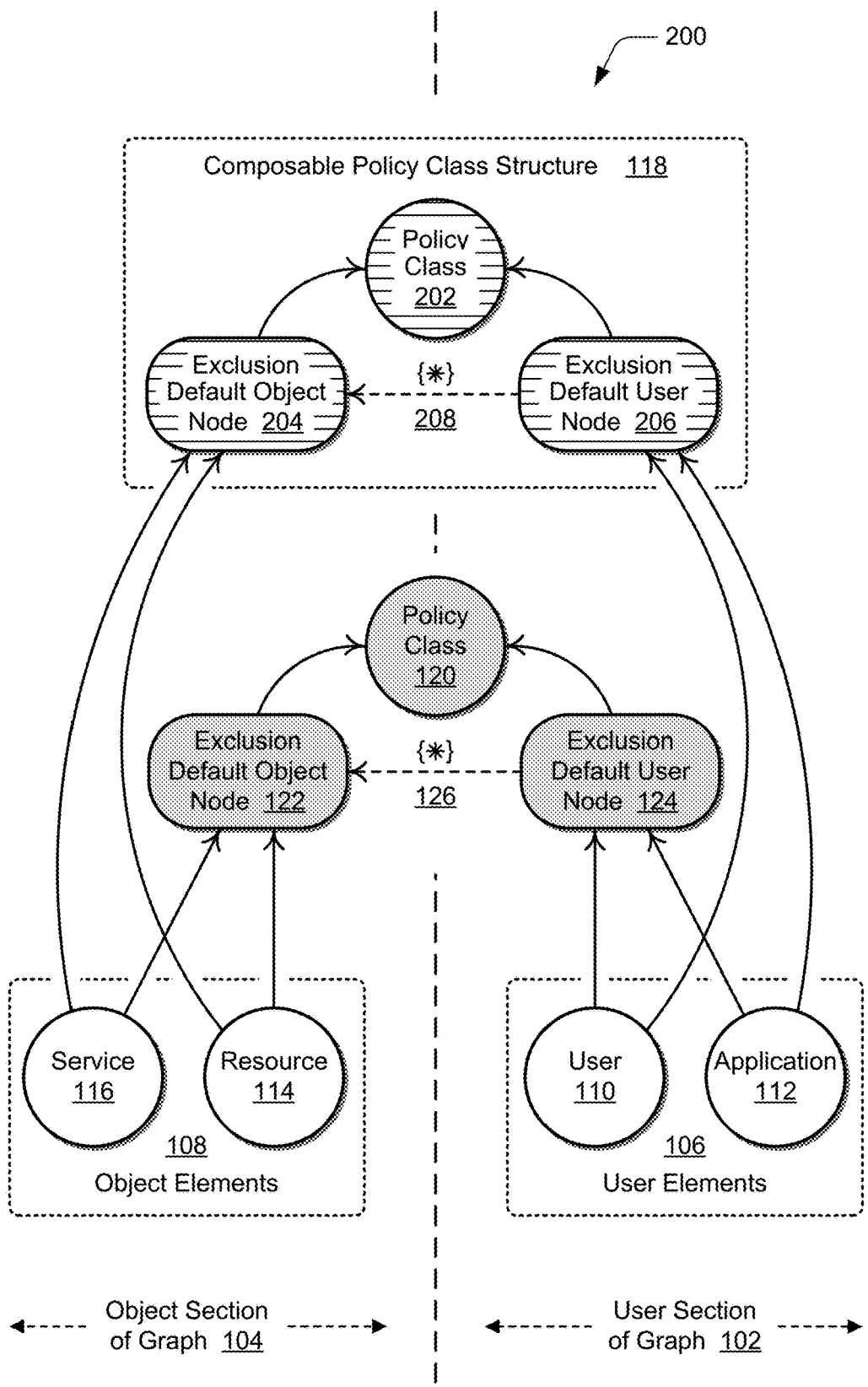
FIGS. 2-6 further illustrate examples of the NGAC graph that includes graph features in accordance with one or more implementations of NGAC graph evaluations.

FIG. 2 further illustrates an example 200 of the next generation access control (NGAC) graph 100 that includes additional graph features, and as generally described, facilitate use of the NGAC graph evaluations. As shown and described with reference to FIG. 1, the NGAC graph 100 includes the user elements 106 and the object elements 108, as well as the policy class 120. In this example 200, the composable policy class structure 118 is utilized to instantiate and configure another policy class 202 of the NGAC graph 100. Together, the multiple policy classes (e.g., policy class 120 and policy class 202) provide the enforceable access criteria by which the user elements 106 that represent the users are allowed or denied access to the object elements 108 that represent the resources and/or services.

The composable policy class structure 118 includes an exclusion default object node 204 of the policy class 202 instantiated in the object section 104 of the NGAC graph 100. Similarly, the composable policy class structure 118 includes an exclusion default user node 206 of the policy class 202 instantiated in the user section 102 of the NGAC graph. The exclusion default object node 204 and the exclusion default user node 206 are each assigned as members of the policy class 202, in the respective object section 104 and the user section 102 of the graph. The composable policy class structure 118 also includes an association 208 that indicates the object elements 108 contained as members of the exclusion default object node 204 grant all of the policy permissions to the user elements 106 that are contained as members of the exclusion default user node 206. The policy permissions indicated by the association 208 allow the user elements 106 to perform operations on contents of the object elements 108 that represent the various resources, such as the resource 114 and the service 116.

As described with reference to the NGAC graph 100 shown in FIG. 1, one or more of the user elements 106 that represent the various users (e.g., user 110 and application 112) in the user section 102 of the NGAC graph 100 can each be contained as a member of the policy class 202 via the exclusion default user node 206 of the policy class. Similarly, one or more of the object elements 108 that represent the various resources (e.g., resource 114 and service 116) in the object section 104 of the NGAC graph 100 can each be contained as a member of the policy class 202 via the exclusion default object node 204 of the policy class.

Figure 3:
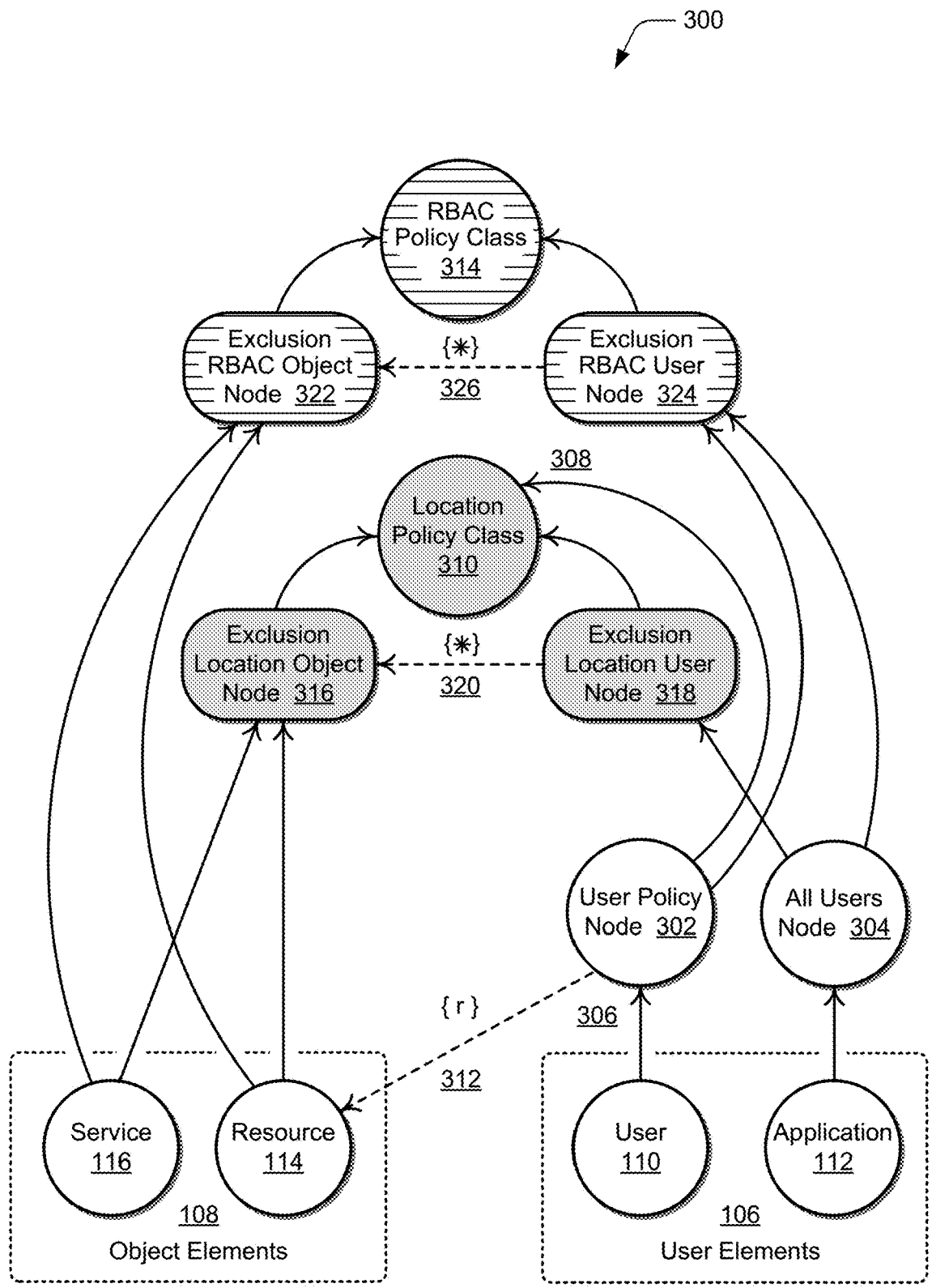

FIG. 3 further illustrates an example 300 of the next generation access control (NGAC) graph 100 that includes additional graph features, and as generally described, facilitate use of the NGAC graph evaluations. As shown and described with reference to FIGS. 1 and 2, the NGAC graph 100 includes the user elements 106 and the object elements 108. In this example 300, the NGAC graph 100 is also implemented with a user policy node 302 and an all users node 304, which are modeled in the user section of the graph. Any number of the user elements 106 that each represent one of the various users in the user section of the graph can be assigned as a member of the user policy node 302 and/or as a member of the all users node 304, such as the user 110 shown assigned at 306 as a member of the user policy node 302. Additionally, the user policy node 302 is assigned at 308 as a member of a location policy class 310, which provides that the user policy node 302 and the user 110 (e.g., via the user policy node 302) are both contained by the location policy class 310.

An association 312 provides that the user policy node 302 grants read access on the resource 114 for the user 110 to perform a read operation on the contents of the resource. As noted above, the user policy node 302 and the user 110 are both contained by the location policy class 310. Accordingly, it can be determined that an access control permission for user 110 to access the resource 114 is specifically provided by the user policy node 302 of the location policy class 310. Notably, the association 312 provides that the user policy node 302 grants read access on the resource 114 for the user 110 to perform a read operation on the contents of the resource 114.

In this example 300, the NGAC graph 100 is shown implemented with multiple, different policy classes that have been configured in the graph utilizing the composable policy class structure 118, which is repeatable to instantiate each of the multiple policy classes. The NGAC graph 100 in this example includes the location policy class 310 and a role-based access control (RBAC) policy class 314. The location policy class 310 designates policy and access control permissions to the object elements 108 according to different geographic locations of the various object elements, such as the resource 114 and the service 116. The RBAC policy class 314 designates policy based on roles of the user elements 106, and models access control permissions on the object elements 108 based on roles of the user elements.

As modeled utilizing the composable policy class structure 118, the location policy class 310 has an associated object attribute, which is the exclusion location object node 316 instantiated in the object section of the NGAC graph 100. The location policy class 310 also has an associated user attribute, which is the exclusion location user node 318 instantiated in the user section of the NGAC graph. The exclusion location object node 316 and the exclusion location user node 318 are each assigned as members of the location policy class 310. Additionally, an association 320 indicates that the object elements 108 contained as members of the exclusion location object node 316 grant all of the location policy permissions to the user elements 106 that are contained as members of the exclusion location user node 318.

Similarly, as modeled utilizing the composable policy class structure 118, the RBAC policy class 314 has an associated object attribute, which is the exclusion RBAC object node 322 instantiated in the object section of the NGAC graph 100. The RBAC policy class 314 also has an associated user attribute, which is the exclusion RBAC user node 324 instantiated in the user section of the NGAC graph. The exclusion RBAC object node 322 and the exclusion RBAC user node 324 are each assigned as members of the RBAC policy class 314. Additionally, an association 326 indicates that the object elements 108 contained as members of the exclusion RBAC object node 322 grant all of the policy permissions to the user elements 106 that are contained as members of the exclusion RBAC user node 324.

Figure 4:
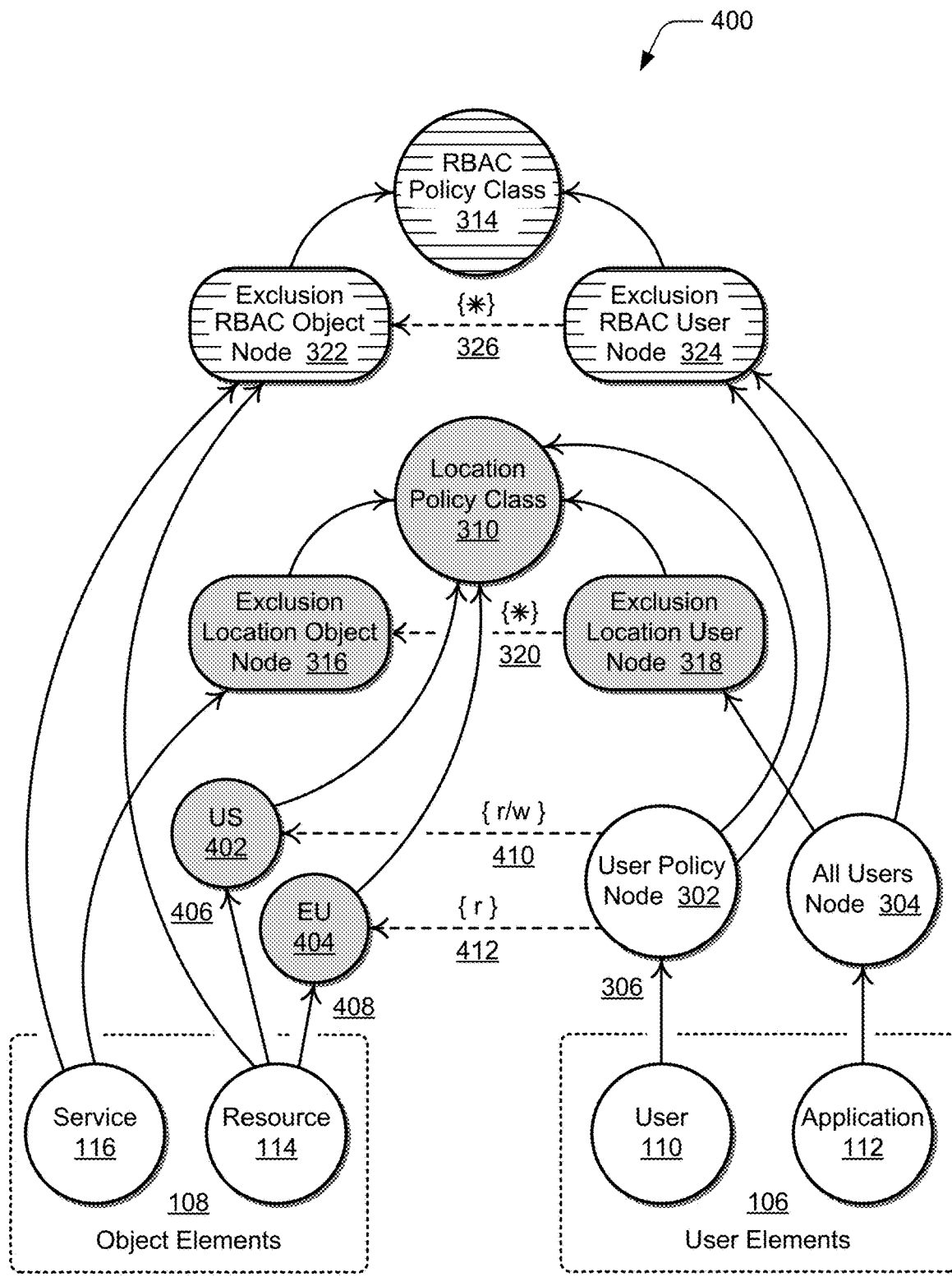

FIG. 4 further illustrates an example 400 of the next generation access control (NGAC) graph 100 that includes additional graph features, and as generally described, facilitate use of the NGAC graph evaluations. As shown and described with reference to FIGS. 1-3, the NGAC graph 100 includes the user elements 106 and the object elements 108, as well as the user policy node 302 and the all users node 304. In this example 400, the NGAC graph 100 is also implemented with additional object attributes that are modeled in the object section of the graph, such as a US location node 402 and an EU location node 404. In this example, the US location node 402 is representative of one or more designated resources that can be accessed as a United States (US) resource according to the enforceable access criteria established by the location policy class 310. Similarly, the EU location node 404 is representative of one or more designated resources that can be accessed as a European Union (EU) resource according to the enforceable access criteria established by the location policy class 310.

In this example 400, the NGAC graph 100 includes the location policy class 310 and the role-based access control (RBAC) policy class 314, and could be implemented to control permissions and user access to resources, depending on United States and European Union privacy concerns. Generally, the resources (e.g., as represented by the object elements 108), such as medical records, banking records, user profiles, and any other types of digitally stored documents and information may include personal user information subject to privacy regulations. Notably, these privacy regulations can vary across countries, regions, and/or jurisdictions. However, these types of resources and data are likely to be transmitted via networks, such as over the Internet, and stored in data stores on an international scale, such as Worldwide in the "cloud" on cloud-based storage that may be physically located throughout the World. Accordingly, privacy regulations mandate and seek to restrict who (users) or what (client applications) can access and use these types of resources, based not only on specific roles of the users and client applications (e.g., the user elements 106), but also based on geophysical location of the users and/or the stored resources.

For example, the General Data Protection Regulation (GDPR) is a regulation that mandates data protection and privacy in the EU, as well as addresses the transfer of personal data outside of the EU. Organizations that process, store, and/or utilize personal user information are required to take the appropriate technical and organizational measures to implement the data protection and privacy standards and regulations. Additionally, the California Consumer Privacy Act (CCPA) is another similar regulation standard that could be modeled with the NGAC graph 100 to control permissions and user access to resources. With reference to the NGAC graph 100, the location policy class 310 designates policy and access control permissions to the object elements 108 according to different geographic locations of the various object elements, such as the resource 114 and the service 116. The RBAC policy class 314 designates policy based on roles of the user elements 106, and models access control permissions on the object elements 108 based on roles of the user elements.

Any number of the object elements 108 that each represent one of the various resources in the object section of the NGAC graph 100 can be assigned as a member of the US location node 402 and/or as a member of the EU location node 404. For example, the resource 114 is shown assigned at 406 as a member of the US location node 402, and assigned at 408 as a member of the EU location node 404. An association 410 provides that the user policy node 302 grants access permissions on the object elements 108 that are members of the US location node 402 for user elements 106 that are members of the user policy node 302. For example, the user policy node 302 grants read and write access on the resource 114 in the US for the user 110 to perform read and write operations on the contents of the resource, as established by the location policy class 310.

Similarly, an association 412 provides that the user policy node 302 grants access permissions on the object elements 108 that are members of the EU location node 404 for user elements 106 that are members of the user policy node 302. For example, the user policy node 302 grants read access on the resource 114 in the EU for the user 110 to perform a read operation on the contents of the resource, as established by the location policy class 310. In this example, the user 110 on the user side of the NGAC graph 100 is contained by the location policy class 310 via user attributes, namely the user policy node 302 of the location policy class. The user 110 can access the resource 114 via the user policy node 302 and the object attributes because the resource 114 on the object side of the NGAC graph 100 is also contained by the location policy class 310 via object attributes, namely the US location node 402 and/or the EU location node 404.

Additionally, the user 110 has the read access permission on the resource 114 in the EU, and has the read and write access permissions on the resource 114 in the US under the RBAC policy class 314. The user 110 is contained by the RBAC policy class 314 via a user attribute, namely the user policy node 302 and the exclusion RBAC user node 324 of the RBAC policy class. Similarly, the resource 114 is contained by the RBAC policy class 314 via an object attribute, namely the exclusion RBAC object node 322 of the RBAC policy class. This is an example implementation of a strict access evaluation mode of the NGAC graph 100, in that the user 110 can access the resource 114 via the user policy node 302 and the object attributes because both the user 110 and the resource 114 are members of both the location policy class 310 and the RBAC policy class 314.

Figure 5:
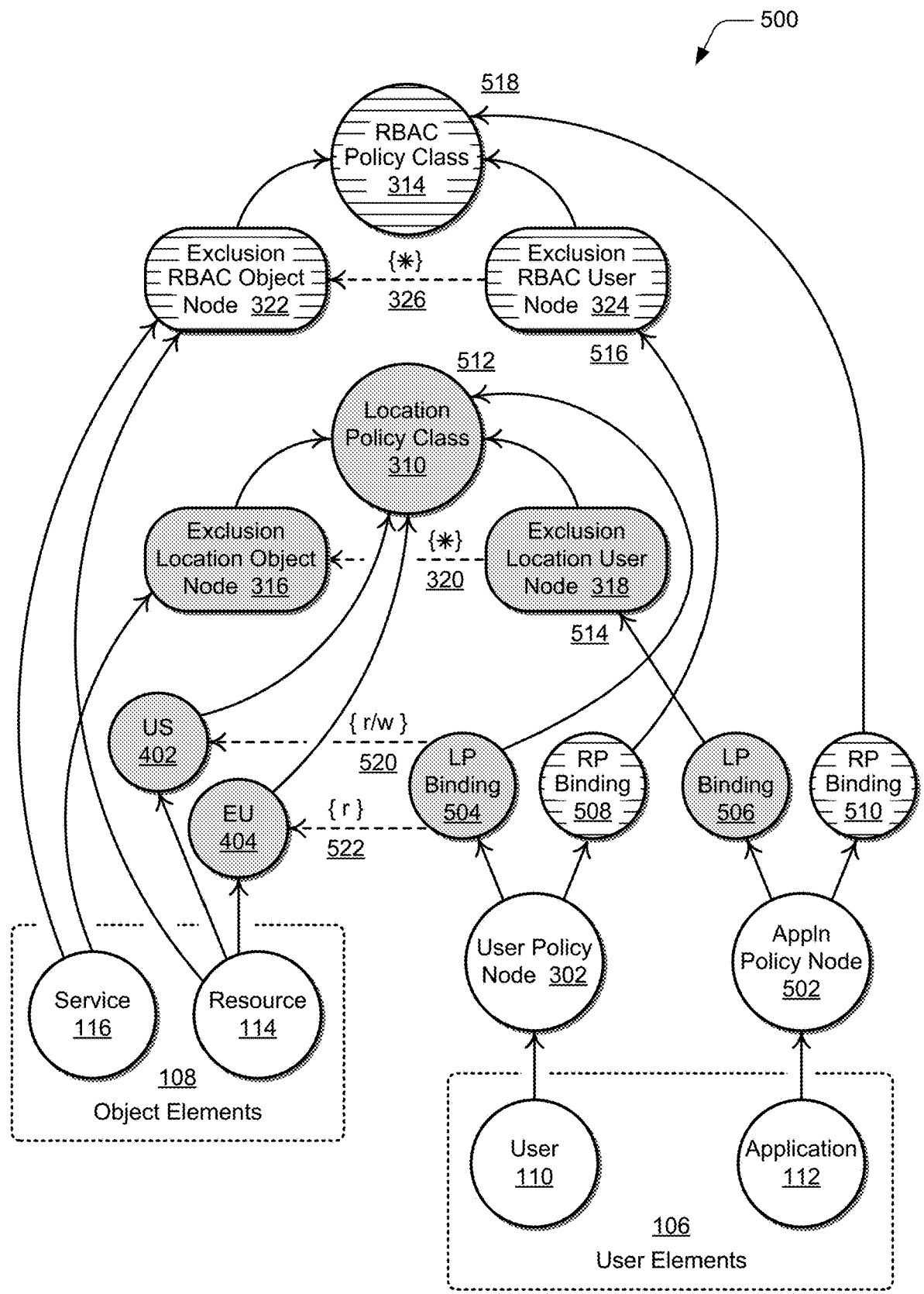

FIG. 5 further illustrates an example 500 of the next generation access control (NGAC) graph 100 that includes additional graph features, and as generally described, facilitate use of the NGAC graph evaluations. As shown and described with reference to FIGS. 1-4, the NGAC graph 100 includes the user elements 106 and the object elements 108, as well as the user policy node 302, the US location node 402, and the EU location node 404. Similar to the user policy node 302, the NGAC graph 100 also includes an application policy node 502. In this example 500, the NGAC graph 100 is also implemented with additional user attributes that are modeled in the user section of the graph as separable policy bindings, such as location policy (LP) bindings 504, 506 and RBAC policy (RP) bindings 508, 510. As described herein, the policy bindings are NGAC graph nodes, and are also referred to as policy binding nodes. The separable policy bindings avoid using the user policy node 302 as the single access point for user 110 to both the US location node 402 and an EU location node 404, as shown in the FIG. 4 configuration of the NGAC graph 100, which may lead to unintentionally granting a user element 106 access to one or both of the location policy nodes.

Each of the separable policy bindings 504-510 correspond to one of the multiple policy classes, and are assigned to the corresponding policy class. For example, the location policy (LP) binding 504 is assigned at 512 to the location policy class 310, and the location policy (LP) binding 506 is assigned at 514 to the location policy class 310 via the exclusion location user node 318. Similarly, the RBAC policy (RP) binding 508 is assigned at 516 as belonging to the exclusion RBAC user node 324 of the RBAC policy class 314, and the RBAC policy (RP) binding 510 is assigned at 518 to the RBAC policy class 314. In practice, the NGAC graph 100 can be implemented so that for every policy class, there is at least one associated binding node. Notably, given a policy node, it will have a separable binding node (also referred to as a sub-binding node) for each policy class that exists in the NGAC graph.

In this example, the user policy node 302 is assigned to the separable policy bindings for each of the policy classes in the user section of the NGAC graph. For example, the user policy node 302 is shown assigned and as a member of the location policy (LP) binding 504 and the RBAC policy (RP) binding 508. Similarly, the application policy node 502 is shown assigned and as a member of the location policy (LP) binding 506 and the RBAC policy (RP) binding 510. Notably, the binding nodes can be created for every existing policy class in the graph, and they may be directly assigned to the corresponding policy class and/or to the exclusion user node for the corresponding policy class.

Additionally, an association 520 indicates that the resource 114 grants policy permissions on the object element 108 that represents the resource 114 for user elements 106 that are members of the user policy node 302, which is itself assigned to the LP binding 504. For example, the resource 114 grants read and write access on the object element 108 that represents the resource 114 for the user 110 to perform read and write operations on the contents of the resource via the association 520, as established by the location policy class 310. Similarly, an association 522 provides that the user policy node 302 grants access permissions (e.g., read access) on the object elements 108 that are members of the EU location node 404 for user elements 106 that are members of the user policy node 302. In this example, the user 110 on the user side of the NGAC graph 100 is contained by the RBAC policy class 314 via user attributes, namely the RP binding 508 and the exclusion RBAC user node 324 of the RBAC policy class. Similarly, the application 112 can access the resource 114 via the RP binding 508 because the resource 114 on the object side of the NGAC graph is also contained by the RBAC policy class 314 via an object attribute, namely the exclusion RBAC object node 322 of the RBAC policy class.

In aspects of the NGAC graph evaluations, as described herein, the configuration of the NGAC graph 100 provides for implementation of additional features, such as an explain feature, an audit feature, and a list feature. These features can be implemented as analysis queries of the NGAC graph 100, from which a policy author can determine specific permissions and access rights on the resources as granted by the object elements 108 for the users represented by the user elements 106. For example, an explain analysis or query can be initiated to determine what type of resource access a user element 106 may be granted according to the policy permissions if the user element 106 is assigned to a particular user attribute in the user section 102 of the NGAC graph. Similarly, an audit analysis or query can be initiated to determine why a particular user element 106 was granted resource access to an object element 108 after the fact, such as to determine which combination of the multiple policy classes in the NGAC graph 100 allowed an unintended resource access by a user element. Accordingly, the policy author can initiate an audit analysis or query to ascertain how an access control decision was determined based on the multiple policy configuration of the NGAC graph. Similarly, the policy author can initiate a list analysis or query to forecast how an access control decision will be determined for a user element 106 that requests access to an object element 108, prior to the actual request.

Given the novel configuration of the NGAC graph 100 as described herein, aspects and features of NGAC graph evaluations can be implemented. The various assignments and associations of the user elements 106 and the object elements 108 in the multiple policy configuration of the NGAC graph 100 can be read semantically, directly from the graph to facilitate formulating and ascertaining the NGAC graph evaluations. In practice, a policy author can independently determine which policy class (or combination of the policies) allowed a user to access a resource or service in the NGAC graph, and secondly, which policy class (if any) was supposed to allow the user to access the resource or the service in the graph. Notably, the NGAC graph can be evaluated using graph evaluation procedures that include to compute an access control decision, generate a user list, generate an object list, generate a permissions test, perform an explain, perform a precheck-audit, and/or perform an audit-explain.

A user list can be generated given a user element 106 and a granted policy permission to identify a set of the object elements 108 that the user element can access based on the granted policy permission. In context of the NGAC framework, the user list procedure is generally similar to determining an access control decision, given a policy permission, a user element 106, and an object element 108 to determine whether the user element has access to the object element. However, given the novel graph structure of the NGAC graph 100 as described herein utilizing the composable policy class structure 118, as well as the novel user attributes and object attributes, the user list procedure operates faster and is more performant, and can be performed on-line during a runtime instantiation of the NGAC graph.

An object list can be generated given an object element 108 and a granted policy permission to identify a set of the user elements 106 that can access the object element based on the granted policy permission. Similarly, a permissions test can be generated given a user element 106 and an object element 108 to identify a set of granted policy permissions that the user element is assigned on the object element. These types of novel graph evaluation procedures can be implemented given the novel graph structure of the NGAC graph 100 as described herein.

A explain procedure can be performed given an object element 108 and a user element 106 to determine a singular traversal path through the NGAC graph 100 between the user element and the object element to perform an action (e.g., read, write, etc.) on the object element. Given an object element 108, a determination can be made as to why a user element 106 has permission to access and perform an action on the object element, which indicates the singular traversal path through the NGAC graph. Again, this novel graph evaluation procedure can be implemented given the novel graph structure and how the policies of the multiple, different policy classes are modeled in the NGAC graph 100 as described herein.

A precheck-audit procedure can be performed given an object element 108 and a user element 106 to determine an effect of an off-line policy permission before the off-line policy permission is granted. The precheck-audit may also be referred to as a "time-forward audit" to determine the effect of what would happen if a policy was implemented in the NGAC graph 100. Notably, a temporary off-line version of the NGAC graph can be updated with a new policy and the precheck-audit procedure performed to determine a policy permission effect without exposing the temporary off-line version of the NGAC graph to other policy enforcement points in the distributed access control system that use multiple instantiations of the graph.

An audit-explain procedure can be performed given a previous state snapshot of the NGAC graph 100 and a logical timestamp to determine why an access by a user element 106 was allowed or not allowed on an object element 108 based on the policy permissions in the NGAC graph at the time of the previous state of the system. The audit-explain may also be referred to as a "time-backward audit" to traverse a snapshot of the NGAC graph at a previous time to evaluate why a user element 106 was allowed access to an object element 108, such as to determine why there may have been a data leak in the system.

Figure 6:
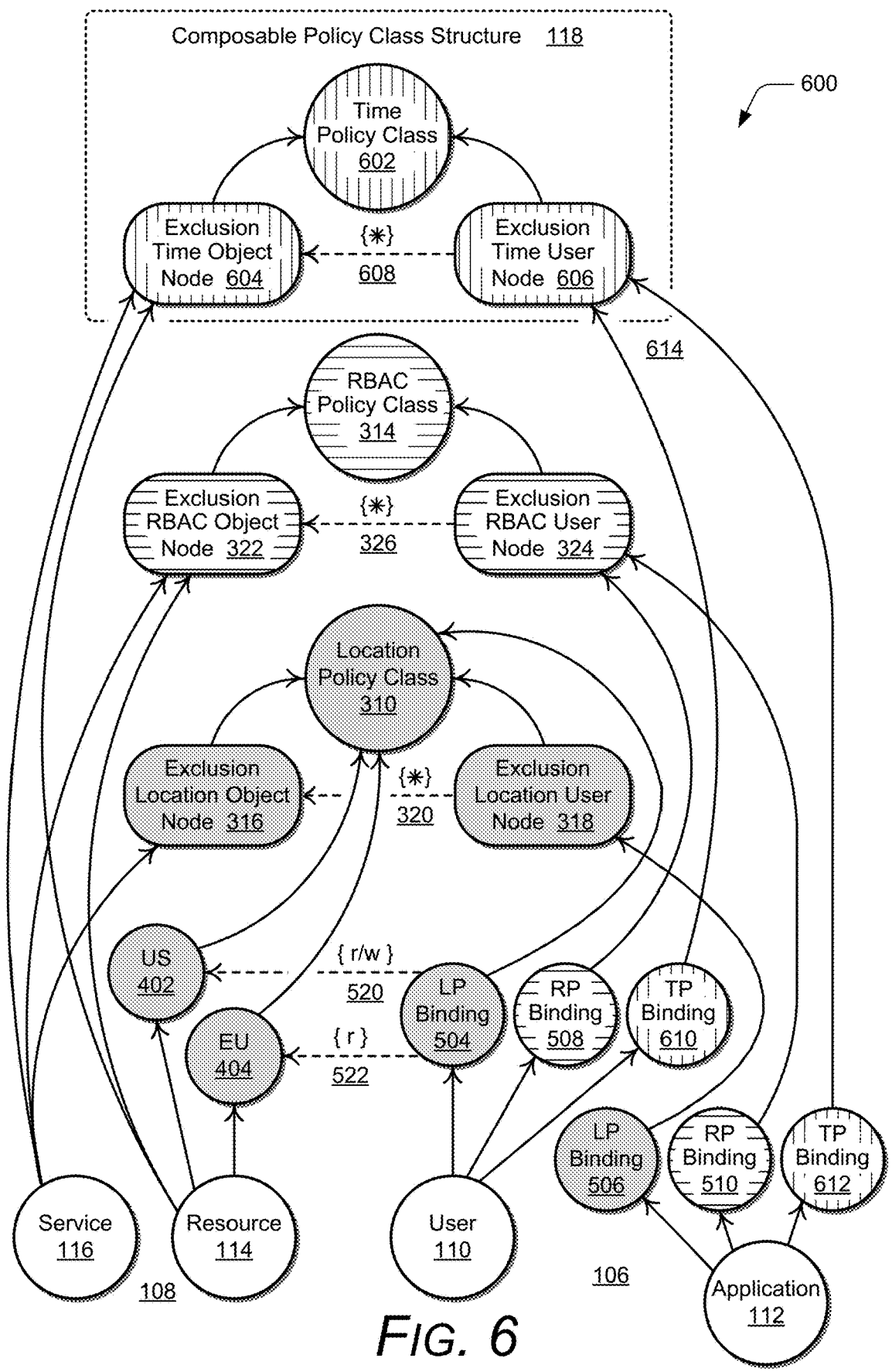

FIG. 6 further illustrates an example 600 of the next generation access control (NGAC) graph 100 that includes additional graph features, and as generally described, facilitate use of the NGAC graph evaluations. As shown and described with reference to FIGS. 1-5, the NGAC graph 100 includes the user elements 106 and the object elements 108, as well as the US location node 402, the EU location node 404, and the separable policy bindings (e.g., the LP bindings 504, 506 and the RP bindings 508, 510). Although not shown in this example 600, the NGAC graph may also be implemented with the user policy node 302 and the application policy node 502 (or similar) as shown and described with reference to FIG. 5. In this example, the composable policy class structure 118 is utilized to implement a time policy class 602 added to the NGAC graph 100 that is shown and described with reference to FIG. 5. This adds a temporal aspect to the access control decisions that are computed using the NGAC graph based on a strict access evaluation mode that takes into account an intersection of all of the access control policy permissions designated by the combination of the multiple policy classes.

The composable policy class structure 118 includes the time policy class 602, as well as an exclusion time object node 604 of the time policy class instantiated in the object section of the NGAC graph. Similarly, the composable policy class structure 118 includes an exclusion time user node 606 of the time policy class 602 instantiated in the user section of the NGAC graph. The exclusion time object node 604 and the exclusion time user node 606 are each assigned as members of the time policy class 602. An association 608 indicates that the object elements 108 contained as members of the exclusion time object node 604 grant all of the time policy permissions to the user elements 106 that are contained as members of the exclusion time user node 606. Additionally, the NGAC graph 100 includes time policy (TP) bindings 610, 612 that correspond to the time policy class 602 and are assigned at 614 to the time policy class. Notably, the separable policy class bindings (e.g., the LP bindings 504, 506; the RP bindings 508, 510; and the TP bindings 610, 612) allow a policy class author to properly compose the policies with specific permissions on each type of different policy class, effectively providing disjoint permissions for every policy class.

In this example, the composable policy class structure 118 provides a safe way to introduce the new time policy class 602 into the NGAC graph 100 without affecting or breaking the other policy class that have already been modeled in the graph, such as the location policy class 310 and the RBAC policy class 314. Notably, the NGAC specification does not specify or detail any such graph configuration to implement or model NGAC. The configuration of the NGAC graph evaluations as described herein also provides for reusing current NGAC graph nodes that already exist in the graph when adding a new policy class to the graph.

Additionally, reusing current graph nodes can prevent or reduce the problems of exponential node expansion that is inherent in other types of access control systems, such as RBAC, leading to improved computational speed when computing an access control decision, and reduced memory storage space needed to save the overall instantiation of the NGAC graph. For example, the NGAC graph 100 already includes the LP binding 504 via which the user 110 can access the resource 114 via the US location node 402 with read and write permissions. The new time policy class 602 and the separable TP bindings 610, 612 can be added into the NGAC graph 100 without needing to also generate additional user attributes that facilitate the location-based policies already present in the graph. Accordingly, the NGAC graph 100 does not exponentially expand by having to add additional user attributes and object attributes with the addition of new policy classes, which can quickly become unmanageable.

In this example 600, the location policy class 310, the RBAC policy class 314, and the time policy class 602 are the combined enforceable access criteria by which the user elements 106 that represent the users are allowed or denied access to the object elements 108 that represent the resources. An access control decision determined based on the combined, multiple policy classes is an example of a strict access evaluation mode of the NGAC graph 100, in that the user 110 can access the resource 114 via the LP binding 504 and the location object attributes because both the user 110 and the resource 114 are members of the location policy class 310, the RBAC policy class 314, and the time policy class 602. Together, the multiple policy classes (e.g., the location policy class 310, the RBAC policy class 314, and the time policy class 602) provide the enforceable access criteria by which the user elements 106 that represent the users are allowed or denied access to the object elements 108 that represent the resources and/or services.

Figure 7:
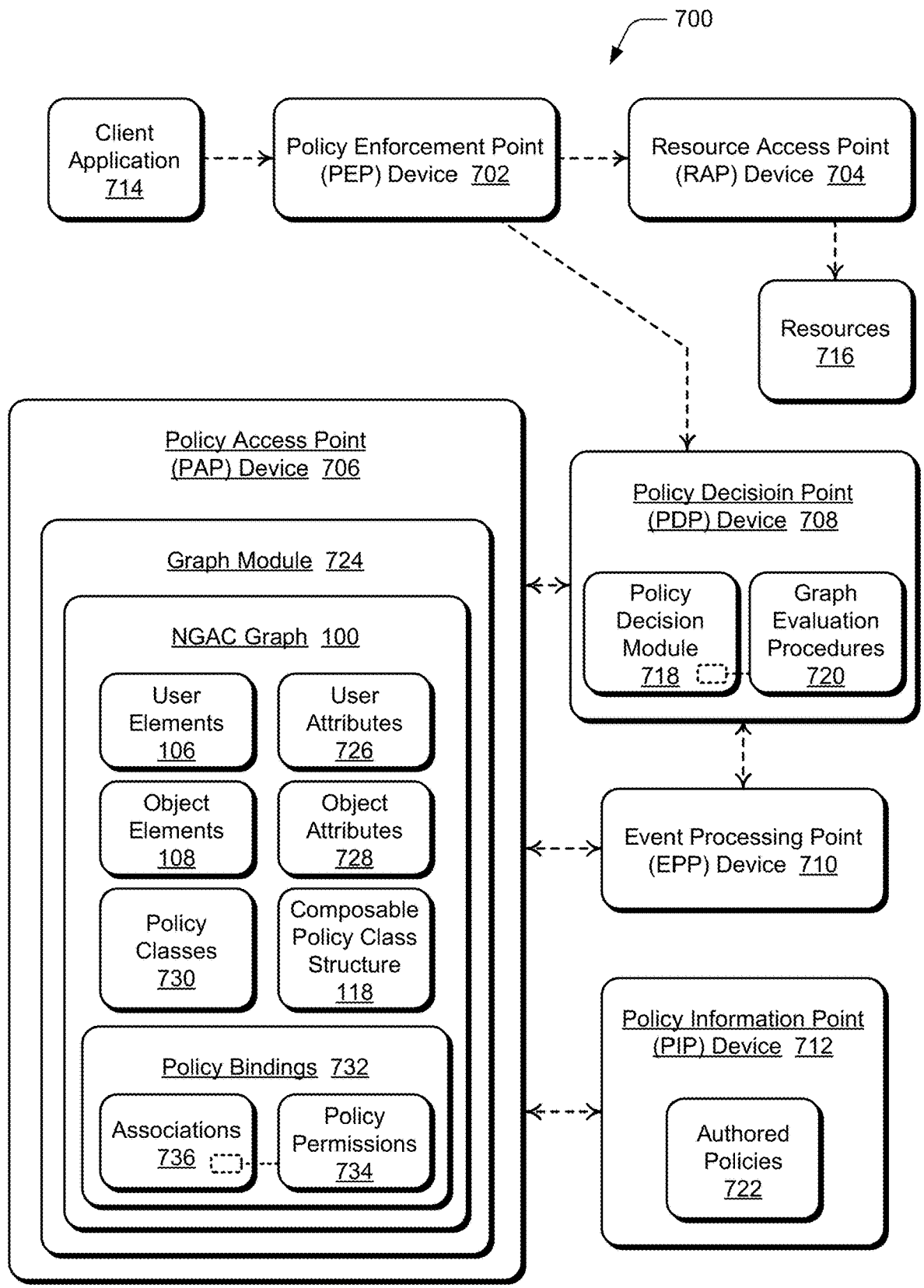
FIGS. 7 and 8 illustrate example environments in which aspects of NGAC graph evaluations can be implemented.

FIG. 7 illustrates an example computing environment 700 in which aspects of NGAC graph evaluations can be implemented in an NGAC graph, as described herein. In practice, the example computing environment 700 may represent an implementation, or partial implementation, of a service mesh architecture. Alternatively, the example computing environment 700 is representative of any type of an access control system, such as in the context of information security. The example environment 700 includes several computing devices that represent and implement the general functional entities of the NGAC framework. Additionally, the various computing devices implement application programming interfaces (APIs) for data communication between the functional entities of the NGAC framework.

The various computing devices shown and described in the example computing environment 700 include a policy enforcement point (PEP) device 702, a resource access point (RAP) device 704, a policy access point (PAP) device 706, a policy decision point (PDP) device 708, an event processing point (EPP) device 710, and a policy information point (PIP) device 712, all of which can be implemented as any type of a computing device, a server device, or a combination of multiple devices implemented in a computing architecture. The various computing devices may each include any number and combination of different components as further described with reference to the example device shown in FIG. 12. For example, the various computing devices generally include memory and a processor, as well as any type of data storage that may be implemented as any suitable memory, memory device, or electronic data storage. Although shown and described as separate, independent computing devices in the example environment 700, any one or more of the computing devices may be combined and implemented together as one computing or server device. Alternatively, any one or more of the various computing devices may be implemented as a combination of multiple computing and/or server devices.

The PEP device 702 implements an NGAC functional entity, the policy enforcement point, which in the context of a service mesh architecture, is a proxy that executes for an application (e.g., is running on the PEP device 702 for a client application 714). Generally, the PEP device 702 exposes APIs for communication by the client application 714 to access resources 716 and policy information. The PEP device 702 is designed to enforce the policy permissions and access control decisions, as determined by the PDP device 708, which implements an NGAC functional entity, the policy decision point. The PEP device 702 can receive a resource access request from the client application 714 as a request to access an object element 108 of a resource 716. The PEP device 702 can then communicate the resource access request to the PDP device 708 as an access control request on behalf of the client application 714.

Generally, the RAP device 704 implements an NGAC functional entity, the resource access point, and exposes APIs for communication by the PEP device 702 to access the protected resources 716, which is an example of a resource entity (e.g., the resource 114). The RAP device 704 manages data transfer to and from the resources 716, as well as access to data storage utilized to maintain the resources. The RAP device 704 is representative of any type of network and/or cloud-based access site that provides a service and/or from which data and information is available, such as via the Internet, for online and/or network-based access. Additionally, the RAP device 704 can be implemented as one or more hardware server devices (e.g., computing devices) in the computing environment and/or in a service mesh architecture, and may include data storage implemented as any suitable memory, memory device, or electronic data storage for network-based data storage.

Generally, the PDP device 708 exposes APIs for communication by the PEP device 702 to obtain an access control decision, and for communication by the EPP device 710, which implements an NGAC functional entity, the event processing point. Generally, the EPP device 710 exposes APIs for communication by the PEP device 702 and/or the PDP device 708 to indicate an occurrence of an event and event context. In aspects of the described NGAC graph evaluations, the PDP device 708 includes a policy decision module 718, which implements the graph evaluation procedures 720 as described in detail with reference to the example computing environment shown in FIG. 8. Generally, the PAP device 706 implements an NGAC functional entity, the policy access point, and exposes APIs for communication by the PDP device 708, the EPP device 710, and the PIP device 712. Generally, the PIP device implements an NGAC functional entity, the policy information point, and exposes APIs for communication by the PAP device 706 to access the authored policies 722 that are maintained by the PIP device 712 and implemented in the NGAC graph 100.

In this example computing environment 700, the PAP device 706 implements a graph module 724, which may be implemented as a module that includes independent processing, memory, and/or logic components functioning as a computing and/or electronic device integrated with the PAP device 706. Alternatively or in addition, the graph module 724 can be implemented in software, in hardware, or as a combination of software and hardware components. In this example, the graph module 724 is implemented as software application or module, such as executable software instructions (e.g., computer-executable instructions) that are executable with a processing system of the PAP device 706 to implement the described techniques and features of NGAC graph evaluations. As a software application or module, the graph module 724 can be stored in memory on the PAP device 706, or in any other suitable memory device or electronic data storage implemented with the module, or remote from the PAP device. Alternatively or in addition, the graph module 724 may be implemented in firmware and/or at least partially in computer hardware. For example, at least part of a graph module may be executable by a computer processor, and/or at least part of the graph module may be implemented in logic circuitry.

In aspects of the described implementations, the graph module 724 at the PAP device 706 can generate the NGAC graph 100 as shown and described with reference to FIGS. 1-6. The graph module 724 can generate the NGAC graph 100 having the bifurcated structure with the user section 102 of the graph and the object section 104 of the graph. The graph module 724 can model the user entities as the user elements 106 in the user section of the graph, and the user entities can be identified in the system with unique user identifiers. Similarly, the graph module 724 can model the resource entities as the object elements 108 in the object section of the graph, and the resource entities can be identified in the system with unique object identifiers. In addition to the user elements 106 and the object elements 108, the graph module 724 can model the NGAC graph 100 in NGAC convention to include the different types of nodes, such as the user attributes 726, the object attributes 728, and the multiple policy classes 730.

An implementation feature of the NGAC graph 100 includes policy bindings 732, which can be modeled as user attributes in the NGAC graph. A policy binding 732 is assigned to a corresponding one of the multiple policy classes 730 and the policy binding delineates a policy permission 734 on an object element 108. The policy bindings 732 include and/or are representative of the associations 736 that are modeled in the NGAC graph 100 to indicate the object elements 108 that grant the policy permissions 734 to the user elements 106. In implementations, a user element 106 can be assigned as a member of a policy binding 732 to associate the user element with the corresponding policy class 730 and to grant the policy permission 734 on an object element 108 to the user element. Generally, the associations 736 are modeled in the NGAC graph 100 as directed graph edges that represent and define the authorization of access rights between policy elements, such as for operations to read, write, create, and delete policy elements and relations. In implementations, the NGAC graph 100 is stored as a bi-directional graph, which provides for walking the graph both frontwards and backwards in memory, and supports implementation of the graph evaluation procedures 720.

The user elements 106 represent any type of user entity, such as the user 110 or the application 112, that can request access to the resources 716 based on access criteria and the policy permissions 734 established by the multiple policy classes 730. In this example environment 700, the client application 714 is an example of a user entity (e.g., the application 112) that may initiate a resource access request to access, obtain, and/or edit a resource. Additionally, the object elements 108 represent any type of resource entity, such as the resource 114 or the service 116, that is accessible by a user entity having allowable policy permissions 734, or is protected from user access by a user that does not have allowable access permissions.

In implementations, the graph module 724 utilizes the composable policy class structure 118 to configure the multiple policy classes 730 in the NGAC graph 100. Notably, the composable policy class structure 118 is repeatable, from which multiple policy classes can be instantiated in the NGAC graph 100, including different types of policy classes. As noted above, the multiple, different types of policy classes can include a location policy class, a role-based access control (RBAC) policy class, a time policy class, and/or any other type of policy class utilized in the context of an access control policy.

Figure 8:
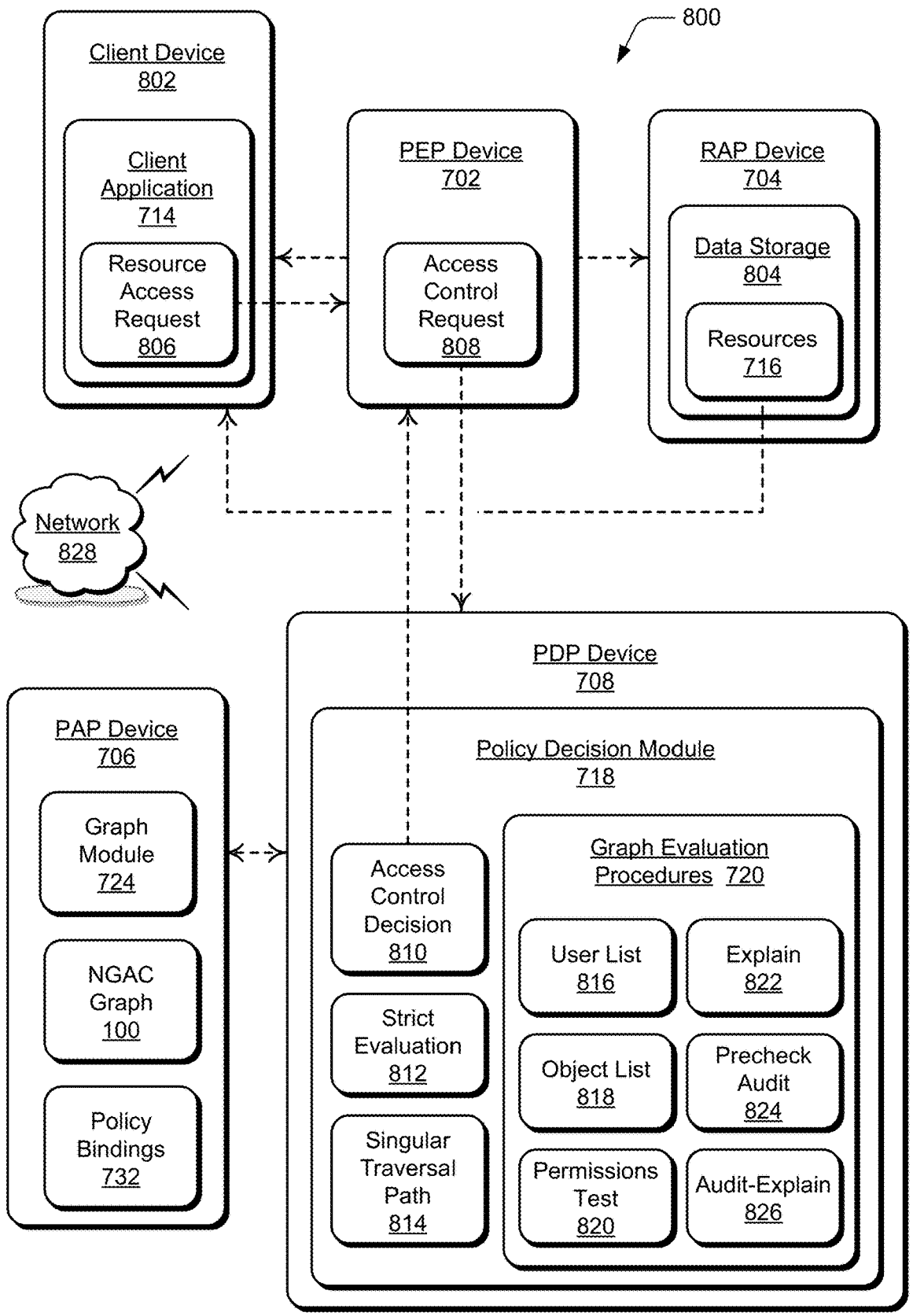

FIG. 8 illustrates an example computing environment 800 in which aspects of NGAC graph evaluations can be implemented in an NGAC graph, as described herein. The example computing environment 800 includes computing devices and features of the example computing environment 700 as shown and described with reference to FIG. 7, and in practice may represent an implementation, or partial implementation, of a service mesh architecture. Alternatively, the example computing environment 800 is representative of any type of an access control system, such as in the context of information security. This example environment 800 includes several computing devices, such as a client device 802 that implements the client application 714, as well as the PEP device 702, the RAP device 704, the PAP device 706, and the PDP device 708. As noted above, the RAP device 704 manages data transfer and access to data storage 804 utilized to maintain the resources 716.

The PDP device 708 implements the policy decision module 718, which may be implemented as a module that includes independent processing, memory, and/or logic components functioning as a computing and/or electronic device integrated with the PDP device 708. Alternatively or in addition, the policy decision module 718 can be implemented in software, in hardware, or as a combination of software and hardware components. In this example, the policy decision module 718 is implemented as software application or module, such as executable software instructions (e.g., computer-executable instructions) that are executable with a processing system of the PDP device 708 to implement the described techniques and features of NGAC graph evaluations. As a software application or module, the policy decision module 718 can be stored in memory on the PDP device 708, or in any other suitable memory device or electronic data storage implemented with the module, or remote from the PDP device. Alternatively or in addition, the policy decision module 718 may be implemented in firmware and/or at least partially in computer hardware. For example, at least part of a graph module may be executable by a computer processor, and/or at least part of the graph module may be implemented in logic circuitry.

As generally described with reference to FIG. 7, the PEP device 702 implements the policy enforcement point, such as in the context of a service mesh architecture, and is designed to enforce the policy permissions and access control decisions, as determined by the PDP device 708. The PEP device 702 can receive a resource access request 806 from the client application 714 as a request to access an object element 108 of a resource 716. The PEP device 702 can then communicate the resource access request 806 on behalf of the client application 714 as an access control request 808, which is communicated to the PDP device 708.

The policy decision module 718 of the PDP device 708 can receive the access control request 808 from the PEP device 702, and the policy decision module 718 can then communicate with the PAP device 706 to utilize the NGAC graph 100 to compute an access control decision 810. The access control decision 810 is computed across the multiple policy classes 730 of the NGAC graph, which provides a basis to evaluate whether the client application 714 is authorized to access the requested resource 716. Given a policy permission 734, a user element 106, and an object element 108, a determination is made as to whether the user element 106 is granted access to a resource represented by the object element 108. In implementations, the policy decision module 718 can compute the access control decision 810 as a single access control decision across the different types of the multiple policy classes 730 of the NGAC graph. Further, the single access control decision 810 can be computed based on a strict evaluation mode 812 that is configured as an intersection of the policy permissions 734, as indicated by the associations 736 and granted by the object elements 108 to access the resources 716 for the user elements 106.

The policy decision module 718 can then initiate the PDP device 708 to respond to the access control request 808 that was received from the PEP device 702 by communicating the access control decision 810 back to the PEP device 702. The access control decision 810 computed by the policy decision module 718 indicates whether to allow or deny the client application 714 access to the resource 716 based on the evaluation utilizing the NGAC graph 100. The PEP device 702 can then either allow or drop the resource access request 806 from the client application 714 at the client device 802 based on the access control decision 810 received from the PDP device 708. If the access control decision 810 indicates to allow the resource access request 806 from the client application 714, the policy decision module 718 can also initiate to return to the PEP device 702, the location of the requested resource 716 in the data storage 804 at the RAP device 704. The PEP device 702 can also issue a command to the resource access point entity at the RAP device 704 to execute the operation associated with the resource access request 806 on the resource 716.

The policy decision module 718 that is implemented by the PDP device 708 can receive query or analysis requests, such as from a policy author who wants to query or analyze the NGAC graph 100 and determine specific permissions and access rights on the resources 716 as granted by the object elements 108 for the users represented by the user elements 106. In aspects of the described implementations, the policy decision module 718 can initiate one or more of the graph evaluation procedures 720 to evaluate the NGAC graph 100 and determine graph analysis information relative to a user element 106, a granted policy permission 734, and/or an object element 108 based in part on a singular traversal path 814 through the NGAC graph between the user element and the object element via the policy binding. Notably, the NGAC graph 100 can be evaluated using the graph evaluation procedures 720 that include to generate a user list 816, generate an object list 818, generate a permissions test 820, perform an explain 822, perform a precheck-audit 824, and/or perform an audit-explain 826.

A user list 816 can be generated given a user element 106 and a granted policy permission 734 to identify a set of the object elements 108 that the user element can access based on the granted policy permission. In context of the NGAC framework, the user list 816 procedure is generally similar to determining an access control decision 810, given a policy permission 734, a user element 106, and an object element 108 to determine whether the user element has access to the object element. However, given the novel graph structure of the NGAC graph 100 as described herein utilizing the composable policy class structure 118, as well as the novel user attributes 726 and object attributes 728, the user list 816 procedure operates faster and is more performant, and can be performed on-line during a runtime instantiation of the NGAC graph.

An object list 818 can be generated given an object element 108 and a granted policy permission 734 to identify a set of the user elements 106 that can access the object element based on the granted policy permission. Similarly, a permissions test 820 can be generated given a user element 106 and an object element 108 to identify a set of granted policy permissions 734 that the user element is assigned on the object element. These types of novel graph evaluation procedures can be implemented given the novel graph structure of the NGAC graph 100 as described herein.

An explain 822 procedure can be performed given an object element 108 and a user element 106 to determine a singular traversal path 814 through the NGAC graph 100 between the user element and the object element to perform an action (e.g., read, write, etc.) on the object element. Given an object element 108, a determination can be made as to why a user element 106 has permission to access and perform an action on the object element, which indicates the singular traversal path 814 through the NGAC graph. Again, this novel graph evaluation procedure can be implemented given the novel graph structure and how the policies of the multiple, different policy classes 730 are modeled in the NGAC graph 100 as described herein. Generally, the associations 736 are modeled in the NGAC graph 100 as directed graph edges that represent and define the authorization of access rights between policy elements, such as for operations to read, write, create, and delete policy elements and relations. Although the NGAC graph 100 can be implemented as a directed acyclic graph (DAG), the NGAC graph is stored as a bi-directional graph, which provides for evaluating the graph (commonly referred to as "walking" the graph in graph terms) both frontwards and backwards in memory, and supports implementation of the graph evaluation procedures 720.

A precheck-audit 824 procedure can be performed given an object element 108 and a user element 106 to determine an effect of an off-line policy permission 734 before the off-line policy permission is granted. The precheck-audit 824 may also be referred to as a time-forward audit to determine the effect of what would happen if a policy were implemented in the NGAC graph 100. Notably, a temporary off-line version of the NGAC graph can be updated with a new policy and the precheck-audit 824 procedure is performed to determine a policy permission effect without exposing the temporary off-line version of the NGAC graph to other policy enforcement points in the distributed access control system that use multiple instantiations of the NGAC graph.

An audit-explain 826 procedure can be performed given a previous state snapshot of the NGAC graph 100 and a logical timestamp to determine why an access by a user element 106 was allowed or not allowed on an object element 108 based on the policy permissions of the NGAC graph 100 at the time of the previous state of the system. The audit-explain 826 may also be referred to as a time-backward audit to traverse a snapshot of the NGAC graph at a previous time to evaluate why a user element 106 was allowed access to an object element 108, such as to determine why there may have been a data leak in the system. In implementations, the graph module 724 implemented by the PAP device 706 can maintain a write-ahead log that is representative of the current state of the NGAC graph 100 before each access control decision 810 or other transaction is completed. Notably, the logical timestamp can be implemented as a causal time that is associated and relevant with the graph only, as a logical clock relative to each snapshot of the graph state that is uniquely identified by the logical timestamps.

Any of the devices, servers, and/or services described herein can communicate via a network 828, such as for data communication between the various computing devices in the example computing environment 800. The network 828 can be implemented to include wired and/or wireless networks. The network can also be implemented using any type of network topology and/or communication protocol, and can be represented or otherwise implemented as a combination of two or more networks, to include IP-based networks and/or the Internet. The network 828 may also include mobile operator networks that are managed by a mobile network operator and/or other network operators, such as a communication service provider, mobile phone provider, and/or Internet service provider.

Example methods 900, 1000, and 1100 are described with reference to respective FIGS. 9, 10, and 11 in accordance with one or more aspects of NGAC graph evaluations. Generally, any of the components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 9:
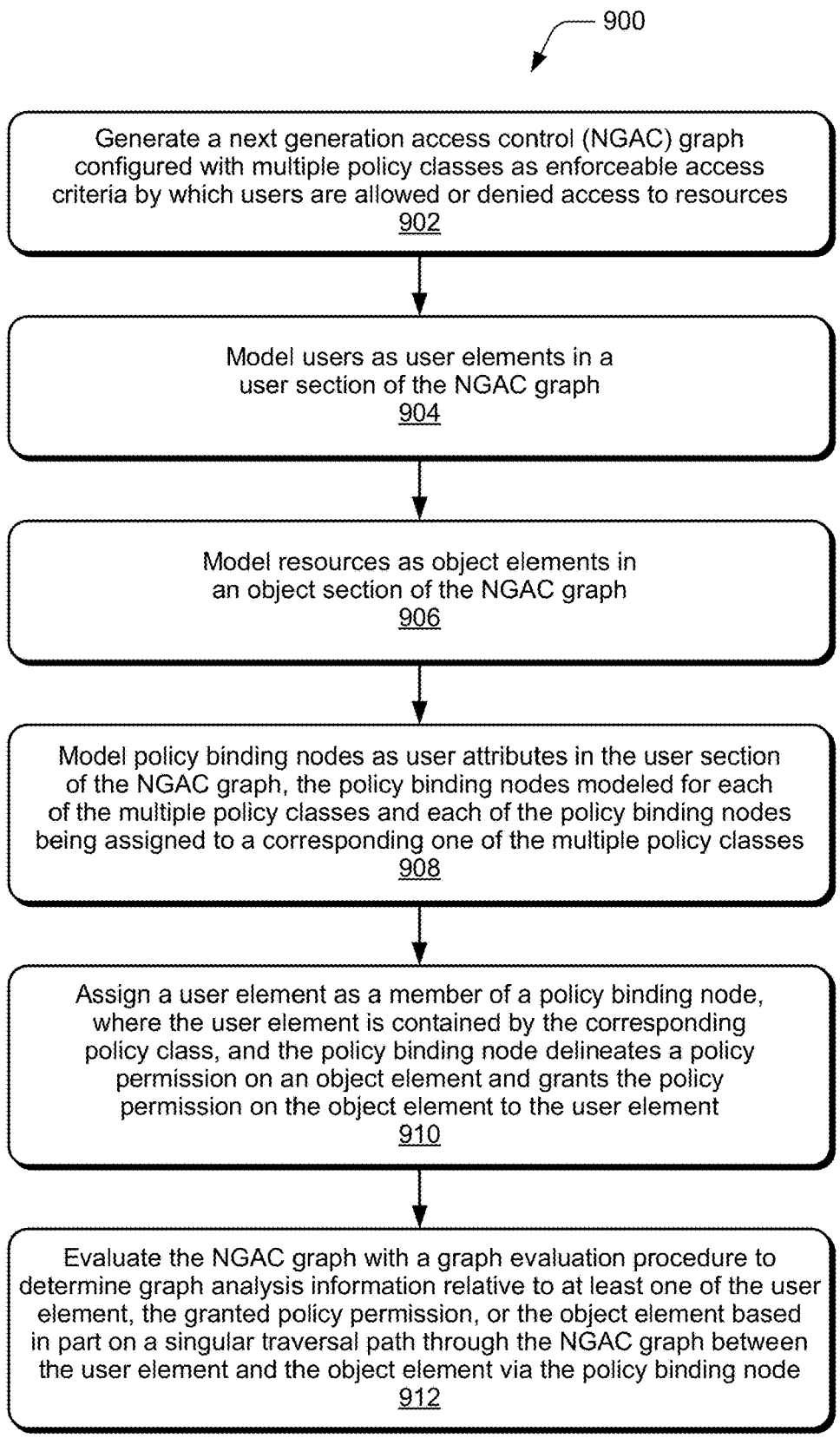
FIGS. 9-11 illustrate example methods of NGAC graph evaluations in accordance with one or more implementations.

FIG. 9 illustrates example method(s) 900 for NGAC graph evaluations, as shown and described with reference to FIGS. 1-8, and is generally described with reference to the graph evaluation procedures implemented by a computing device. The order in which the method is described is not intended to be construed as a limitation, and any number or combination of the method operations can be combined in any order to implement a method, or an alternate method.

At 902, a next generation access control (NGAC) graph is generated with multiple policy classes as enforceable access criteria by which users are allowed or denied access to resources. For example, the graph module 724 implemented by the PAP device 706 can generate the NGAC graph 100 having the bifurcated structure with the user section that includes the users modeled as the user elements 106 and the object section that includes the resources modeled as the object elements 108. The sections of the NGAC graph 100 may also be referred to as the user side and the object side of the graph. The NGAC graph is a directed acyclic graph (DAG) structure generated and stored as a bi-directional graph structure facilitating the NGAC graph evaluations, as described herein. The multiple policy classes 730 of the NGAC graph 100 are configurable utilizing the composable policy class structure 118 that is repeatable to instantiate each of the multiple policy classes in the NGAC graph. In implementations, the multiple, different types of policy classes 822 can include the location policy class 310, the role-based access control (RBAC) policy class 314, the time policy class 602, and/or any other type of policy class.

At 904, users are modeled as user elements in the user section of the NGAC graph. For example, the graph module 724 implemented by the PAP device 706 can model the user entities as the user elements 106 in the user section 102 of the NGAC graph 100, and the graph can include any number of various different types of users, such as the user 110 and the application 112 as shown in the examples of the NGAC graph.

At 906, resources are modeled as object elements in the object section of the NGAC graph. For example, the graph module 724 implemented by the PAP device 706 can model the resource entities as the object elements 108 in the object section 104 of the NGAC graph 100, and the graph can include any number and different types of resources, such as the resource 114 and the service 116 as shown in the examples of the NGAC graph.

At 908, policy binding nodes are modeled as user attributes in the user section of the NGAC graph, the policy binding nodes modeled for each of the multiple policy classes and each of the policy binding nodes being assigned to a corresponding one of the multiple policy classes. For example, the graph module 724 implemented by the PAP device 706 can model the NGAC graph 100 with the separable policy bindings (e.g., policy binding nodes), such as the location policy (LP) bindings 504, 506; the RBAC policy (RP) bindings 508, 510; and/or the time policy (TP) bindings 610, 612. The separable policy bindings are modeled for each of the multiple policy classes, and are assigned as a member of the corresponding policy class, such as the location policy (LP) bindings 504, 506 assigned to the location policy class 310; the RBAC policy (RP) bindings 508, 510 assigned to the RBAC policy class 314; and the time policy (TP) bindings 610, 612 assigned to the time policy class 602.

At 910, a user element is assigned as a member of a policy binding node, where the user element is contained by the corresponding policy class, and the policy binding node delineates a policy permission on an object element and grants the policy permission on the object element to the user element. For example, the graph module 724 implemented by the PAP device 706 can assign any of the user elements 106 as a member of the user policy node 302, such as the user 110 assigned as a member of the user policy node 302. Additionally, the user policy node 302 is assigned as a member of the location policy class 310, which provides that the user policy node 302 and the user 110 (e.g., via the user policy node 302) are both contained by the location policy class 310. Alternatively, the NGAC graph can be implemented with a user element (e.g., user 110) assigned as a member of one or more policy binding nodes (e.g., the location policy (LP) binding 504, the RBAC policy (RP) binding 508, and the time policy (TP) bindings 610), and the one or more policy binding nodes delineate policy permissions on object elements 108, such as to grant a policy permission on an object element to a user element.

At 912, the NGAC graph is evaluated with a graph evaluation procedure to determine graph analysis information relative to at least one of the user element, the granted policy permission, or the object element based in part on a singular traversal path through the NGAC graph between the user element and the object element via the policy binding node. For example, the policy decision module 718 implemented by the PDP device 708 can initiate one or more of the graph evaluation procedures 720 to evaluate the NGAC graph 100 and determine graph analysis information relative to a user element 106, a granted policy permission 734, and/or an object element 108 based in part on a singular traversal path 814 through the NGAC graph between the user element and the object element via the policy binding node. Notably, the NGAC graph 100 can be evaluated using the graph evaluation procedures 720 that include to generate a user list 816, generate an object list 818, generate a permissions test 820, perform an explain 822, perform a precheck-audit 824, and/or perform an audit-explain 826.

Figure 10:
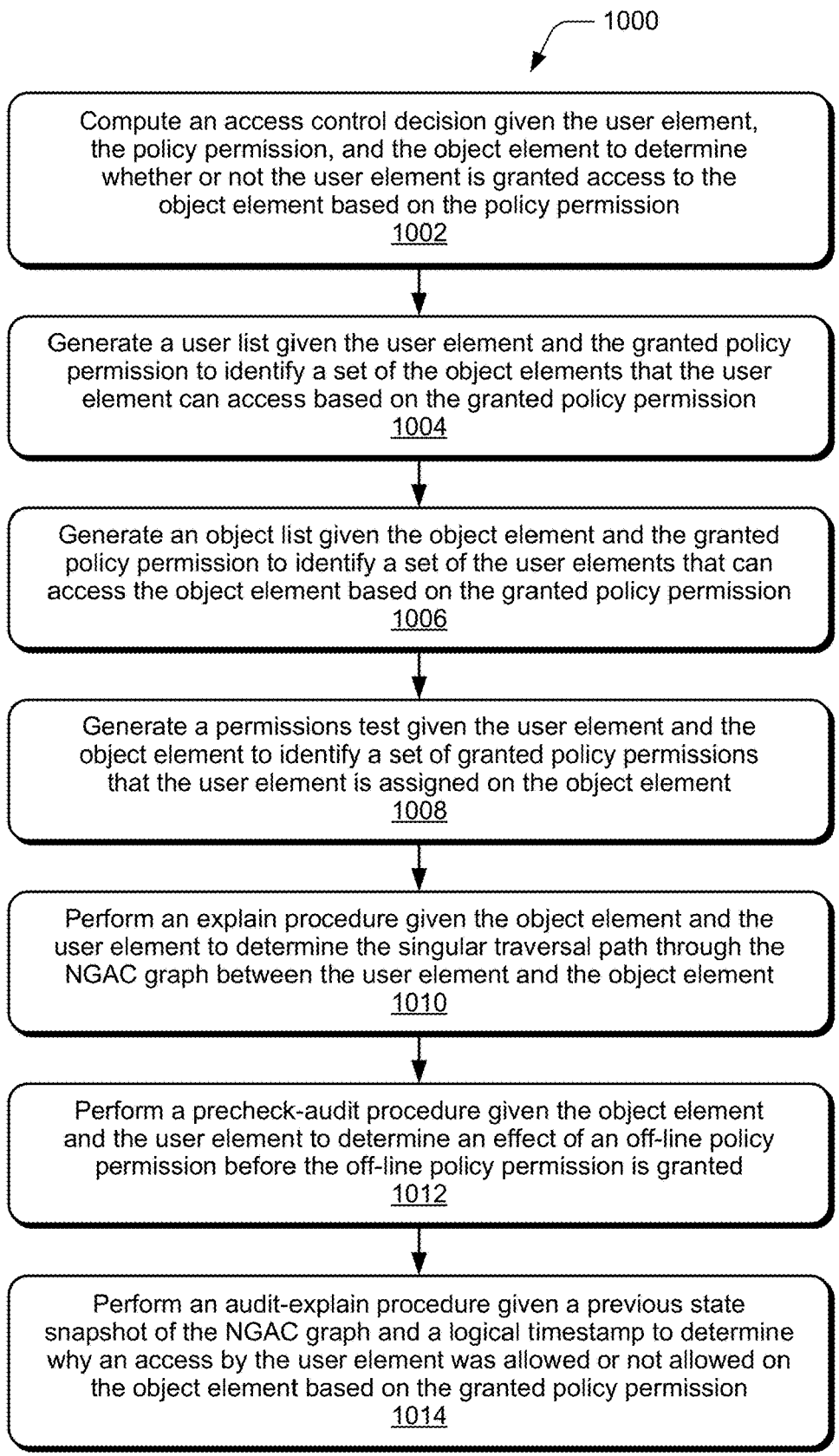

FIG. 10 illustrates example method(s) 1000 for NGAC graph evaluations, as shown and described with reference to FIGS. 1-8, and is generally described with reference to the graph evaluation procedures implemented by a computing device. The order in which the method is described is not intended to be construed as a limitation, and any number or combination of the method operations can be combined in any order to implement a method, or an alternate method.

At 1002, an access control decision is computed given the user element, the policy permission, and the object element to determine whether or not the user element is granted access to the object element based on the policy permission. For example, the policy decision module 718 implemented by the PDP device 708 can receive the access control request 808 from the PEP device 702, and then communicate with the PAP device 706 to utilize the NGAC graph 100 to compute an access control decision 810. The access control decision 810 is computed across the multiple policy classes 730 of the NGAC graph, which provides a basis to evaluate whether the client application 714 is authorized to access the requested resource 716. Given a policy permission 734, a user element 106, and an object element 108, a determination is made as to whether the user element 106 is granted access to a resource represented by the object element 108. In implementations, the policy decision module 718 can compute the access control decision 810 as a single access control decision across the different types of the multiple policy classes 730 of the NGAC graph.

At 1004, a user list is generated given the user element and the granted policy permission to identify a set of the object elements that the user element can access based on the granted policy permission. For example, the policy decision module 718 implemented by the PDP device 708 can initiate a graph evaluation procedure 720 to generate a user list 816 given a user element 106 and a granted policy permission 734 to identify a set of the object elements 108 that the user element can access based on the granted policy permission.

At 1006, an object list is generated given the object element and the granted policy permission to identify a set of the user elements that can access the object element based on the granted policy permission. For example, the policy decision module 718 implemented by the PDP device 708 can initiate a graph evaluation procedure 720 to generate an object list 818 given an object element 108 and a granted policy permission 734 to identify a set of the user elements 106 that can access the object element based on the granted policy permission.

At 1008, a permissions test is generated given the user element and the object element to identify a set of granted policy permissions that the user element is assigned on the object element. For example, the policy decision module 718 implemented by the PDP device 708 can initiate a graph evaluation procedure 720 to generate a permissions test 820 given a user element 106 and an object element 108 to identify a set of granted policy permissions 734 that the user element is assigned on the object element.

At 1010, an explain procedure is performed given the object element and the user element to determine the singular traversal path through the NGAC graph between the user element and the object element. For example, the policy decision module 718 implemented by the PDP device 708 can initiate a graph evaluation procedure 720 to perform an explain 822 procedure given an object element 108 and a user element 106 to determine a singular traversal path 814 through the NGAC graph 100 between the user element and the object element to perform an action (e.g., read, write, etc.) on the object element. Given an object element 108, a determination can be made as to why a user element 106 has permission to access and perform an action on the object element, which indicates the singular traversal path 814 through the NGAC graph.

At 1012, a precheck-audit procedure is performed given the object element and the user element to determine an effect of an off-line policy permission before the off-line policy permission is granted. For example, the policy decision module 718 implemented by the PDP device 708 can initiate a graph evaluation procedure 720 to perform a precheck-audit 824 procedure given an object element 108 and a user element 106 to determine an effect of an off-line policy permission 734 before the off-line policy permission is granted. The precheck-audit 824 may also be referred to as a time-forward audit to determine the effect of what would happen if a policy were implemented in the NGAC graph 100. Notably, a temporary off-line version of the NGAC graph can be updated with a new policy and the precheck-audit 824 procedure is performed to determine a policy permission effect without exposing the temporary off-line version of the NGAC graph to other policy enforcement points in the distributed access control system that use multiple instantiations of the NGAC graph.

At 1014, an audit-explain procedure is performed given a previous state snapshot of the NGAC graph and a logical timestamp to determine why an access by the user element was allowed or not allowed on the object element based on the granted policy permission. For example, the policy decision module 718 implemented by the PDP device 708 can initiate a graph evaluation procedure 720 to perform an audit-explain 826 procedure given a previous state snapshot of the NGAC graph 100 and a logical timestamp to determine why an access by a user element 106 was allowed or not allowed on an object element 108 based on the policy permissions of the NGAC graph 100 at the time of the previous state of the system. The audit-explain 826 may also be referred to as a time-backward audit to traverse a snapshot of the NGAC graph at a previous time to evaluate why a user element 106 was allowed access to an object element 108, such as to determine why there may have been a data leak in the system.

Figure 11:
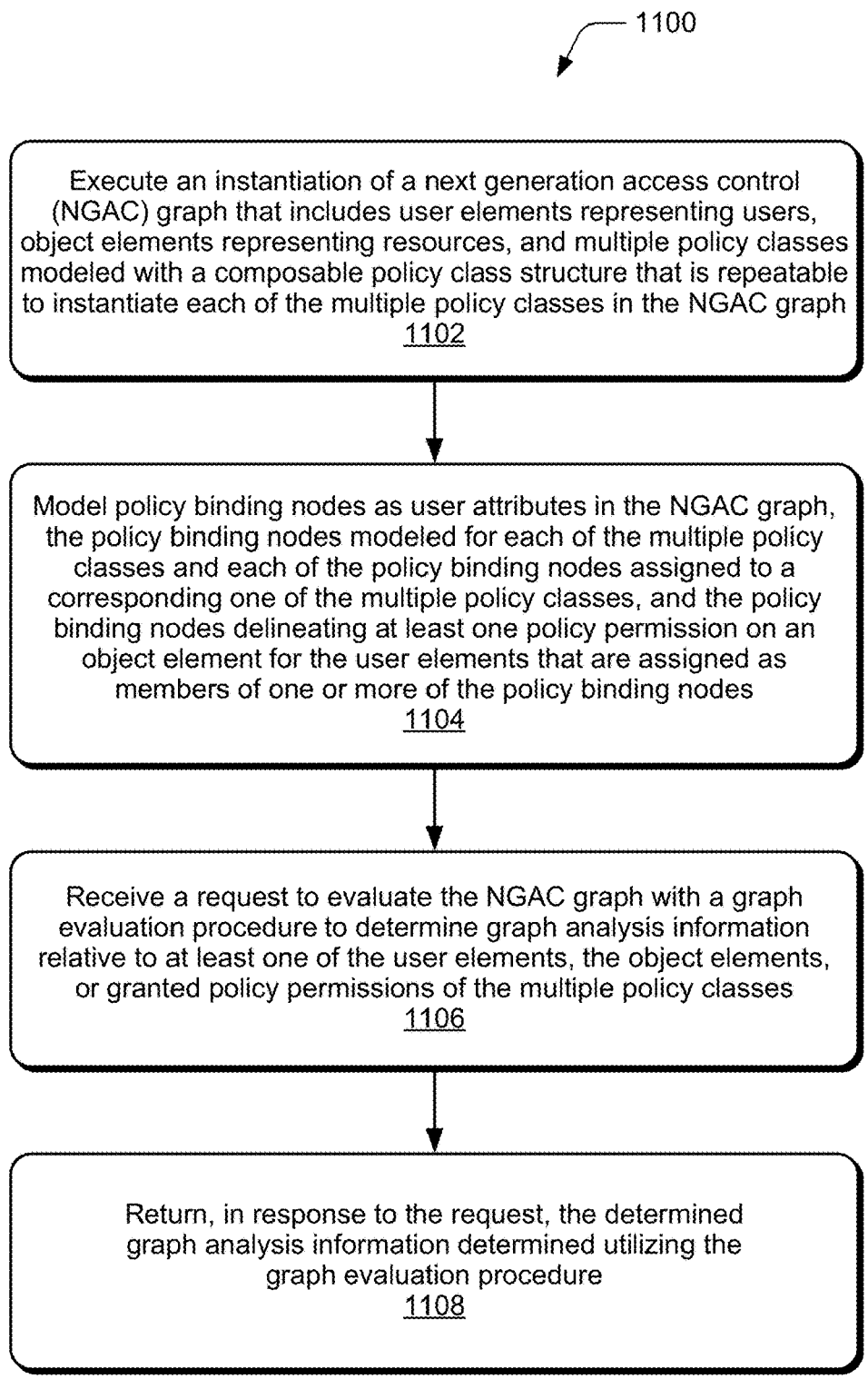

FIG. 11 illustrates example method(s) 1100 for NGAC graph evaluations, as shown and described with reference to FIGS. 1-8, and is generally described with reference to the graph evaluation procedures implemented by a computing device. The order in which the method is described is not intended to be construed as a limitation, and any number or combination of the method operations can be combined in any order to implement a method, or an alternate method.

At 1102, an instantiation of a next generation access control (NGAC) graph is executed, and the NGAC graph includes user elements representing users, object elements representing resources, and multiple policy classes modeled with a composable policy class structure that is repeatable to instantiate each of the multiple policy classes in the NGAC graph. For example, the graph module 724 implemented by the PAP device 706 can generate an instantiation of the NGAC graph 100, which is executable by the PAP device 706 in a distributed access control system. The NGAC graph 100 includes the user elements 106 representing users, the object elements 108 representing resources, and multiple policy classes 730 modeled with the composable policy class structure 118 that is repeatable to instantiate each of the multiple policy classes in the NGAC graph. As shown and described with reference to FIGS. 1-7, the policy classes 730 of the NGAC graph 100 are the enforceable access criteria by which the user elements 106 are allowed or denied access to the object elements 108 that represent the resources.

At 1104, policy binding nodes are modeled as user attributes in the NGAC graph, the policy binding nodes modeled for each of the multiple policy classes and each of the policy binding nodes assigned to a corresponding one of the multiple policy classes, and the policy binding nodes delineating at least one policy permission on an object element for the user elements that are assigned as members of one or more of the policy binding nodes. For example, the graph module 724 implemented by the PAP device 706 can model the policy bindings 732 in the NGAC graph 100 as user attributes, the policy bindings 732 modeled for each of the multiple policy classes and each of the policy bindings being assigned to a corresponding one of the multiple policy classes 730. The policy bindings delineate at least one policy permission 734 on an object element 108 for the user elements 106 that are assigned as members of one or more of the policy bindings. The separable policy bindings 732 each correspond to one of the multiple policy classes, such as the location policy (LP) bindings 504, 506; the RBAC policy (RP) bindings 508, 510; and/or the time policy (TP) bindings 610, 612. The separable policy bindings 732 correspond to one of the multiple policy classes, and are assigned to the corresponding policy class, such as the location policy (LP) bindings 504, 506 assigned to the location policy class 310; the RBAC policy (RP) bindings 508, 510 assigned to the RBAC policy class 314; and the time policy (TP) bindings 610, 612 assigned to the time policy class 602.

At 1106, a request is received to evaluate the NGAC graph with a graph evaluation procedure to determine graph analysis information relative to at least one of the user elements, the object elements, or granted policy permissions of the multiple policy classes. For example, the policy decision module 718 that is implemented by the PDP device 708 can receive a query or analysis request, such as from a policy author who wants to query or analyze the NGAC graph 100 and determine specific permissions and access rights on the resources 716 as granted by the object elements 108 for the users represented by the user elements 106. In aspects of the described implementations, the policy decision module 718 can initiate one or more of the graph evaluation procedures 720 to evaluate the NGAC graph 100 and determine graph analysis information relative to a user element 106, a granted policy permission 734, and/or an object element 108 based in part on a singular traversal path 814 through the NGAC graph between the user element and the object element via the policy binding.

At 1108, in response to the request, the determined graph analysis information determined utilizing the graph evaluation procedure is returned. For example, as described with reference to FIG. 10, the policy decision module 718 implemented by the PDP device 708 can utilize the NGAC graph 100 to compute an access control decision 810, which is computed across the multiple policy classes 730 of the NGAC graph, and provides a basis to evaluate whether the client application 714 is authorized to access a requested resource 716. Given a policy permission 734, a user element 106, and an object element 108, a determination is made as to whether the user element 106 is granted access to a resource represented by the object element 108 (as at 1002).

The policy decision module 718 implemented by the PDP device 708 can also implement the graph evaluation procedures 720 to determine the graph analysis information, such as to generate a user list 816 given a user element 106 and a granted policy permission 734 to identify a set of the object elements 108 that the user element can access based on the granted policy permission (as at 1004); generate an object list 818 given an object element 108 and a granted policy permission 734 to identify a set of the user elements 106 that can access the object element based on the granted policy permission (as at 1006); or generate a permissions test 820 given a user element 106 and an object element 108 to identify a set of granted policy permissions 734 that the user element is assigned on the object element (as at 1008). Further, the graph evaluation procedures 720 can be implemented by the policy decision module 718 to perform an explain 822 procedure given an object element 108 and a user element 106 to determine a singular traversal path 814 through the NGAC graph 100 between the user element and the object element to perform an action (e.g., read, write, etc.) on the object element (as at 1010). The graph evaluation procedures 720 can be implemented by the policy decision module 718 to determine the graph analysis information, such as by performing a precheck-audit 824 procedure given an object element 108 and a user element 106 to determine an effect of an off-line policy permission 734 before the off-line policy permission is granted (as at 1012); or by performing an audit-explain 826 procedure given a previous state snapshot of the NGAC graph 100 and a logical timestamp to determine why an access by a user element 106 was allowed or not allowed on an object element 108 based on the policy permissions of the NGAC graph 100 at the time of the previous state of the system (as at 1014).

Figure 12:
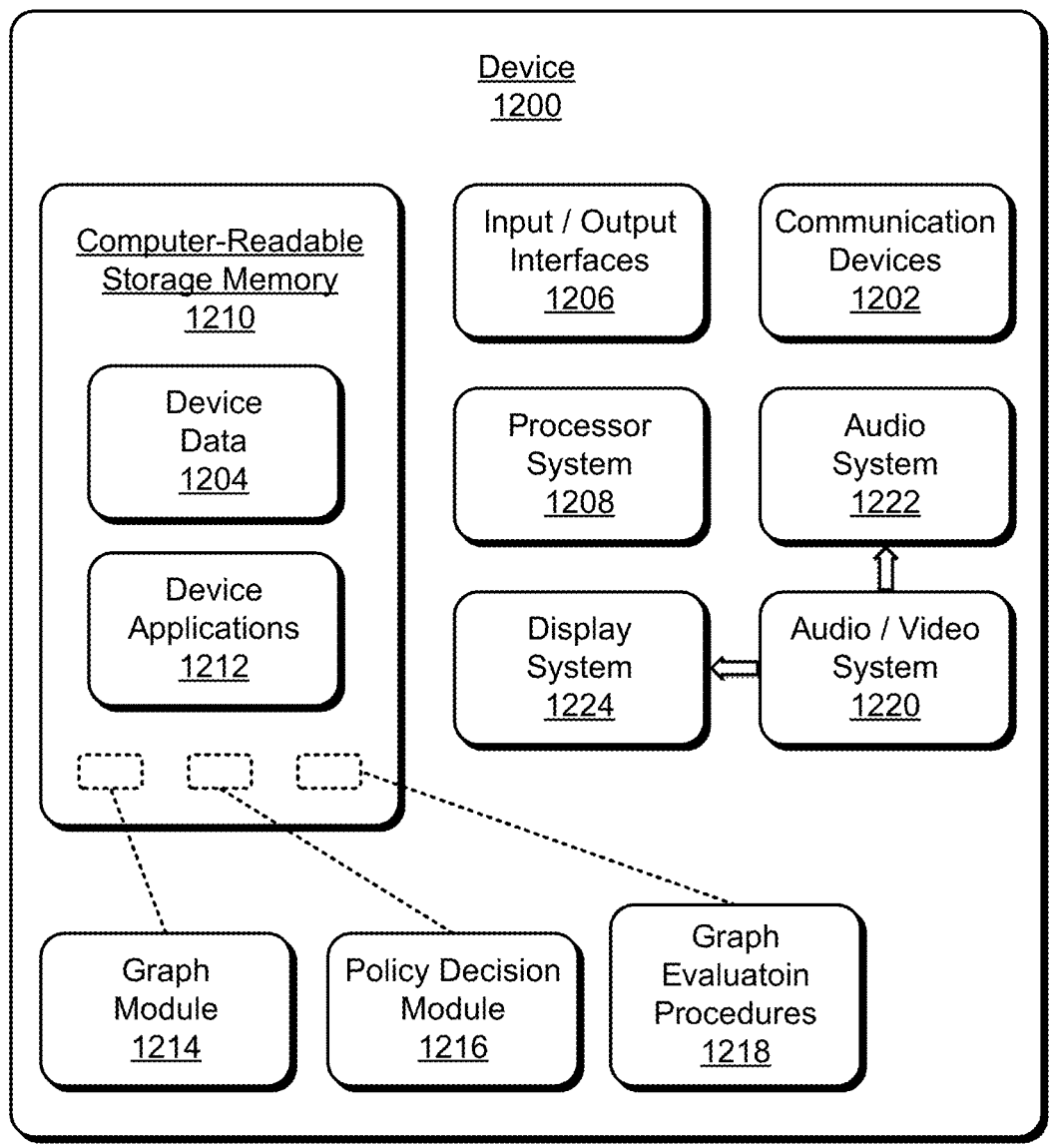
FIG. 12 illustrates an example device that can implement aspects of NGAC graph evaluations.

FIG. 12 illustrates an example device 1200, which can implement aspects of the techniques and features of NGAC graph evaluations, as described herein. The example device 1200 can be implemented as any of the devices, servers, or services described with reference to the previous FIGS. 1-11, such as any type of a computing device, or other computing and/or electronic device. For example, the PEP device 702, the RAP device 704, the PAP device 706, the PDP device 708, the EPP device 710, the PIP device 712, and the client device 802 of the example computing environments 700 and 800 may each be implemented as the example device 1200.

The example device 1200 can include various, different communication devices 1202 that enable wired and/or wireless communication of device data 1204 with other devices, such as any of the NGAC graph data and resource information, as well as the computer data and content that is generated, processed, determined, received, stored, and/or transferred from one computing device to another, and/or synched between multiple computing devices. Generally, the device data 1204 can include any form of audio, video, image, graphics, and/or electronic data that is generated by applications executing on the device. The communication devices 1202 can also include transceivers for cellular phone communication and/or for network data communication.

The example device 1200 can also include various, different types of input/output (I/O) interfaces 1206, such as data network interfaces that provide connection and/or communication links between the devices, data networks, and other devices. The I/O interfaces can be used to couple the device to any type of components, peripherals, and/or accessory devices, such as a computer input device that may be integrated with the example device 1200. The I/O interfaces may also include data input ports via which any type of data, information, media content, and/or inputs can be received, such as user inputs to the device, as well as any type of audio, video, image, graphics, and/or electronic data received from any content and/or data source.

The example device 1200 includes a processor system 1208 that may be implemented at least partially in hardware, such as with any type of microprocessors, controllers, and the like that process executable instructions. The processor system 1208 can include components of an integrated circuit, a programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The example device 1200 may further include any type of a system bus or other data and command transfer system that couples the various components within the device. A system bus can include any one or combination of different bus structures and architectures, as well as control and data lines.

The example device 1200 also includes computer-readable storage memory 1210 (e.g., memory and/or memory devices), such as data storage devices implemented in hardware that can be accessed by a computing device, and that provide persistent storage of data and executable instructions (e.g., software applications, modules, programs, functions, and the like). Examples of computer-readable storage memory 1210 include volatile memory and non-volatile memory, fixed and removable media devices, and any suitable memory device or electronic data storage that maintains data for computing device access. The computer-readable storage memory 1210 can include various implementations of random-access memory (RAM), read-only memory (ROM), flash memory, and other types of storage media in various memory device configurations. The example device 1200 may also include a mass storage media device.

The computer-readable storage memory 1210 provides storage of the device data 1204, other types of information and/or electronic data, and various device applications 1212 (e.g., software applications and/or modules). For example, an operating system can be maintained as a software application with the computer-readable storage memory and executed by the processor system 1208. In this example, the device 1200 includes a graph module 1214, a policy decision module 1216, and graph evaluation procedures 1218 that implement various aspects and features of the described techniques for NGAC graph evaluations. The graph module 1214, the policy decision module 1216, and the graph evaluation procedures 1218 may each be implemented with hardware components and/or in software as one of the device applications 1212, such as when the example device 1200 is implemented as any one of the PAP device 706 and the PDP device 708 of the example computing environments 700 and 800 shown in respective FIGS. 7 and 8.

An example of the graph module 1214 includes the graph module 724 that is implemented as a software application and/or as hardware components by the PAP device 706. Similarly, an example of the policy decision module 1216 includes the policy decision module 718 that is implemented as a software application and/or as hardware components by the PDP device 708. Further, an example of the graph evaluation procedures 1218 includes the graph evaluation procedures 720 that are implemented as software applications or modules, and/or as hardware components by the PDP device 708. In implementations, the graph module 1214, the policy decision module 1216, and/or the graph evaluation procedures 1218 may include independent processing, memory, and logic components as a computing and/or electronic device integrated with the example device 1200.

The example device 1200 can also include an audio and/or video processing system 1220 that generates audio data for an audio system 1222 and/or generates display data for a display system 1224. The audio system and/or the display system include any types of devices that generate, process, display, and/or otherwise render audio, video, display, and/or image data. In implementations, the audio system and/or the display system are integrated components of the example device 1200. Alternatively, the audio system and/or the display system are external, peripheral components to the example device.

In embodiments, at least part of the techniques described for NGAC graph evaluations may be implemented in a distributed system, such as in the context of a computing environment configured as a service mesh architecture, or as any type of an access control system. A distributed system can facilitate to abstract the functionality of hardware, such as with server devices and/or software resources of the computing environment. For example, the software resources may include applications and/or data that can be utilized while computer processing is executed on servers that are remote from the example device 1200.

Although implementations of NGAC graph evaluations have been described in language specific to features and/or methods, the appended claims are not necessarily limited to the specific features or methods described. Rather, the specific features and methods are disclosed as example implementations of the NGAC graph evaluations, and other equivalent features and methods are intended to be within the scope of the appended claims. Further, various different examples are described and it is to be appreciated that each described example can be implemented independently or in connection with one or more other described examples. Additional aspects of the techniques, features, devices, and/or methods discussed herein relate to one or more of the following:

In a digital medium environment for graph-based access control, a method implemented by at least one computing device, the method comprising: generating a next generation access control (NGAC) graph configured with multiple policy classes as enforceable access criteria by which users are allowed or denied access to resources, the NGAC graph having a bifurcated structure with a user section that includes the users modeled as user elements and an object section that includes the resources modeled as object elements; modeling policy binding nodes as user attributes in the user section of the NGAC graph, the policy binding nodes modeled for each of the multiple policy classes and each of the policy binding nodes assigned to a corresponding one of the multiple policy classes; assigning a user element as a member of a policy binding node, the user element being contained by the corresponding policy class, and the policy binding node delineating at least one policy permission on an object element and granting the policy permission on the object element to the user element; and evaluating the NGAC graph with a graph evaluation procedure to determine graph analysis information relative to at least one of the user element, the granted policy permission, or the object element based in part on a singular traversal path through the NGAC graph between the user element and the object element via the policy binding node.

Alternatively or in addition to the above described method, any one or combination of: the NGAC graph is a directed acyclic graph (DAG) structure generated and stored as a bi-directional graph structure facilitating the evaluating of the NGAC graph with the graph evaluation procedure. The graph evaluation procedure comprises computing an access control decision given the user element, the policy permission, and the object element to determine whether or not the user element is granted access to the object element based on the policy permission. The graph evaluation procedure comprises generating a user list given the user element and the granted policy permission to identify a set of the object elements that the user element can access based on the granted policy permission. The graph evaluation procedure comprises generating an object list given the object element and the granted policy permission to identify a set of the user elements that can access the object element based on the granted policy permission. The graph evaluation procedure comprises generating a permissions test given the user element and the object element to identify a set of granted policy permissions that the user element is assigned on the object element. The graph evaluation procedure comprises performing an explain procedure given the object element and the user element to determine the singular traversal path through the NGAC graph between the user element and the object element. The graph evaluation procedure comprises performing a precheck-audit procedure given the object element and the user element to determine an effect of an off-line policy permission before the off-line policy permission is granted. The graph evaluation procedure comprises performing an audit-explain procedure given a previous state snapshot of the NGAC graph and a logical timestamp to determine why an access by the user element was allowed or not allowed on the object element based on the granted policy permission.

In a digital medium environment for graph-based access control, a method implemented by at least one computing device, the method comprising: executing an instantiation of a next generation access control (NGAC) graph that includes user elements representing users, object elements representing resources, and multiple policy classes modeled with a composable policy class structure that is repeatable to instantiate each of the multiple policy classes in the NGAC graph; modeling policy binding nodes as user attributes in the NGAC graph, the policy binding nodes modeled for each of the multiple policy classes and each of the policy binding nodes assigned to a corresponding one of the multiple policy classes, and the policy binding nodes delineating at least one policy permission on an object element for the user elements that are assigned as members of one or more of the policy binding nodes; receiving a request to evaluate the NGAC graph with a graph evaluation procedure to determine graph analysis information relative to at least one of the user elements, the object elements, or granted policy permissions of the multiple policy classes; and returning, in response to the request, the determined graph analysis information determined utilizing the graph evaluation procedure.

Alternatively or in addition to the above described method, any one or combination of: the graph evaluation procedure comprises computing an access control decision given a user element, a policy permission, and an object element to determine whether or not the user element is granted access to the object element based on the policy permission. The graph evaluation procedure determines the graph analysis information by one of: generating a user list given a user element and a granted policy permission to identify a set of the object elements that the user element can access based on the granted policy permission; generating an object list given an object element and the granted policy permission to identify a set of the user elements that can access the object element based on the granted policy permission; or generating a permissions test given the user element and the object element to identify a set of granted policy permissions that the user element is assigned on the object element. The graph evaluation procedure comprises performing an explain procedure given an object element and a user element to determine a singular traversal path through the NGAC graph between the user element and the object element. The graph evaluation procedure determines the graph analysis information by one of: performing a precheck-audit procedure given an object element and a user element to determine an effect of an off-line policy permission before the off-line policy permission is granted; or performing an audit-explain procedure given a previous state snapshot of the NGAC graph and a logical timestamp to determine why an access by the user element was allowed or not allowed on the object element based on a granted policy permission.

A computing device implemented for graph-based access control in a digital medium environment, the computing device comprising: a memory to maintain a next generation access control (NGAC) graph that includes user elements representing users, object elements representing resources, and multiple policy classes; a graph module implemented at least partially in computer hardware to model policy binding nodes as user attributes in the NGAC graph, the policy binding nodes modeled for each of the multiple policy classes and each of the policy binding nodes assigned to a corresponding one of the multiple policy classes, one or more of the policy binding nodes delineating at least one policy permission on an object element, and a user element assigned as a member of one of the policy binding nodes is contained by the corresponding policy class and the policy binding node grants the policy permission on the object element to the user element; and a policy decision module implemented at least partially in the computer hardware to evaluate the NGAC graph with a graph evaluation procedure to determine graph analysis information relative to at least one of the user element, the granted policy permission, or the object element.

Alternatively or in addition to the above described computing device, any one or combination of: the NGAC graph is a directed acyclic graph (DAG) structure generated and stored in the memory as a bi-directional graph structure facilitating the graph evaluation procedure to determine the graph analysis information. The policy decision module implements the graph evaluation procedure to compute an access control decision given the user element, the policy permission, and the object element to determine whether or not the user element is granted access to the object element based on the policy permission. The policy decision module implements the graph evaluation procedure to generate a user list given the user element and the granted policy permission to identify a set of the object elements that the user element can access based on the granted policy permission. The policy decision module implements the graph evaluation procedure to generate an object list given the object element and the granted policy permission to identify a set of the user elements that can access the object element based on the granted policy permission. The policy decision module implements the graph evaluation procedure to generate a permissions test given the user element and the object element to identify a set of granted policy permissions that the user element is assigned on the object element. The policy decision module implements the graph evaluation procedure to perform an explain procedure given the object element and the user element to determine a singular traversal path through the NGAC graph between the user element and the object element. The policy decision module implements the graph evaluation procedure to perform a precheck-audit procedure given the object element and the user element to determine an effect of an off-line policy permission before the off-line policy permission is granted. The policy decision module implements the graph evaluation procedure to perform an audit-explain procedure given a previous state snapshot of the NGAC graph and a logical timestamp to determine why an access by the user element was allowed or not allowed on the object element based on the granted policy permission.

The invention claimed is:

1. In a digital medium environment for graph-based access control, a method implemented by at least one computing device, the method comprising:

generating a next generation access control (NGAC) graph configured with multiple policy classes as enforceable access criteria by which users are allowed or denied access to resources, the NGAC graph having a bifurcated structure with a user section that includes the users modeled as user elements and an object section that includes the resources modeled as object elements;

modeling policy binding nodes as user attributes in the user section of the NGAC graph, the policy binding nodes modeled for each of the multiple policy classes and each of the policy binding nodes assigned to a corresponding one of the multiple policy classes, the NGAC graph being a directed acyclic graph (DAG structure generated and stored as a bi-directional graph structure facilitating evaluation of the NGAC graph with a graph evaluation procedure;

assigning a user element as a member of a policy binding node, the user element being contained by the corresponding policy class, and the policy binding node delineating at least one policy permission on an object element and granting the policy permission on the object element to the user element; and evaluating the NGAC graph with the graph evaluation procedure to determine graph analysis information relative to at least one of the user element, the granted policy permission, or the object element based in part on a singular traversal path through the NGAC graph between the user element and the object element via the policy binding node.

2. The method of claim 1, wherein the graph evaluation procedure comprises computing an access control decision given the user element, the policy permission, and the object element to determine whether or not the user element is granted access to the object element based on the policy permission.

3. The method of claim 1, wherein the graph evaluation procedure comprises generating a user list given the user element and the granted policy permission to identify a set of the object elements that the user element can access based on the granted policy permission.

4. The method of claim 1, wherein the graph evaluation procedure comprises generating an object list given the object element and the granted policy permission to identify a set of the user elements that can access the object element based on the granted policy permission.

5. The method of claim 1, wherein the graph evaluation procedure comprises generating a permissions test given the user element and the object element to identify a set of granted policy permissions that the user element is assigned on the object element.

6. The method of claim 1, wherein the graph evaluation procedure comprises performing an explain procedure given the object element and the user element to determine the singular traversal path through the NGAC graph between the user element and the object element.

7. The method of claim 1, wherein the graph evaluation procedure comprises performing a precheck-audit procedure given the object element and the user element to determine an effect of an off-line policy permission before the off-line policy permission is granted.

8. The method of claim 1, wherein the graph evaluation procedure comprises performing an audit-explain procedure given a previous state snapshot of the NGAC graph and a logical timestamp to determine why an access by the user element was allowed or not allowed on the object element based on the granted policy permission.

9. In a digital medium environment for graph-based access control, a method implemented by at least one computing device, the method comprising:

executing an instantiation of a next generation access control (NGAC) graph that includes user elements representing users, object elements representing resources, and multiple policy classes modeled with a composable policy class structure that is repeatable to instantiate each of the multiple policy classes in the NGAC graph, the NGAC graph being a directed acyclic graph (DAG) structure generated and stored as a bi-directional graph structure facilitating evaluation of the NGAC graph with a graph evaluation procedure;

modeling policy binding nodes as user attributes in the NGAC graph, the policy binding nodes modeled for each of the multiple policy classes and each of the policy binding nodes assigned to a corresponding one of the multiple policy classes, and the policy binding nodes delineating at least one policy permission on an object element for the user elements that are assigned as members of one or more of the policy binding nodes;

receiving a request to evaluate the NGAC graph with the graph evaluation procedure to determine graph analysis information relative to at least one of the user elements, the object elements, or granted policy permissions of the multiple policy classes; and returning, in response to the request, the determined graph analysis information determined utilizing the graph evaluation procedure.

10. The method of claim 9, wherein the graph evaluation procedure comprises computing an access control decision given a user element, a policy permission, and an object element to determine whether or not the user element is granted access to the object element based on the policy permission.

11. The method of claim 9, wherein the graph evaluation procedure determines the graph analysis information by one of:

generating a user list given a user element and a granted policy permission to identify a set of the object elements that the user element can access based on the granted policy permission;

generating an object list given an object element and the granted policy permission to identify a set of the user elements that can access the object element based on the granted policy permission; or generating a permissions test given the user element and the object element to identify a set of granted policy permissions that the user element is assigned on the object element.

12. The method of claim 9, wherein the graph evaluation procedure comprises performing an explain procedure given an object element and a user element to determine a singular traversal path through the NGAC graph between the user element and the object element.

13. The method of claim 9, wherein the graph evaluation procedure determines the graph analysis information by one of:

performing a precheck-audit procedure given an object element and a user element to determine an effect of an off-line policy permission before the off-line policy permission is granted; or performing an audit-explain procedure given a previous state snapshot of the NGAC graph and a logical timestamp to determine why an access by the user element was allowed or not allowed on the object element based on a granted policy permission.

14. A computing device implemented for graph-based access control in a digital medium environment, the computing device comprising:
- a memory to maintain a next generation access control (NGAC) graph that includes user elements representing users, object elements representing resources, and multiple policy classes, the NGAC graph being a directed acyclic graph (DAG) structure generated and stored in the memory as a bi-directional graph structure facilitating a graph evaluation procedure to determine graph analysis information;
- a graph module implemented at least partially in computer hardware to model policy binding nodes as user attributes in the NGAC graph, the policy binding nodes modeled for each of the multiple policy classes and each of the policy binding nodes assigned to a corresponding one of the multiple policy classes, one or more of the policy binding nodes delineating at least one policy permission on an object element, and a user element assigned as a member of one of the policy binding nodes is contained by the corresponding policy class and the policy binding node grants the policy permission on the object element to the user element; and
- a policy decision module implemented at least partially in the computer hardware to evaluate the NGAC graph with the graph evaluation procedure to determine the graph analysis information relative to at least one of the user element, the granted policy permission, or the object element.

15. The computing device of claim 14, wherein the policy decision module implements the graph evaluation procedure to compute an access control decision given the user element, the policy permission, and the object element to determine whether or not the user element is granted access to the object element based on the policy permission.

16. The computing device of claim 14, wherein the policy decision module implements the graph evaluation procedure to generate a user list given the user element and the granted policy permission to identify a set of the object elements that the user element can access based on the granted policy permission.

17. The computing device of claim 14, wherein the policy decision module implements the graph evaluation procedure to generate an object list given the object element and the granted policy permission to identify a set of the user elements that can access the object element based on the granted policy permission.

18. The computing device of claim 14, wherein the policy decision module implements the graph evaluation procedure to generate a permissions test given the user element and the object element to identify a set of granted policy permissions that the user element is assigned on the object element.

19. The computing device of claim 14, wherein the policy decision module implements the graph evaluation procedure to perform an explain procedure given the object element and the user element to determine a singular traversal path through the NGAC graph between the user element and the object element.

20. The computing device of claim 14, wherein the policy decision module implements the graph evaluation procedure to perform a precheck-audit procedure given the object element and the user element to determine an effect of an off-line policy permission before the off-line policy permission is granted.

21. The computing device of claim 14, wherein the policy decision module implements the graph evaluation procedure to perform an audit-explain procedure given a previous state snapshot of the NGAC graph and a logical timestamp to determine why an access by the user element was allowed or not allowed on the object element based on the granted policy permission.

* * * * *